(12) United States Patent
Lee et al.

(10) Patent No.: US 9,973,505 B2
(45) Date of Patent: May 15, 2018

(54) METHOD FOR CONTROLLING CONTENTS AND ELECTRONIC DEVICE THEREOF

(71) Applicant: Samsung Electronics Co., Ltd., Suwon-si (KR)

(72) Inventors: Okseon Lee, Suwon-si (KR); Yongseok Park, Seoul (KR); Jinho Lee, Seoul (KR); Youngki Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 122 days.

(21) Appl. No.: 14/995,918

(22) Filed: Jan. 14, 2016

(65) Prior Publication Data
US 2016/0205103 A1  Jul. 14, 2016

(30) Foreign Application Priority Data

Jan. 14, 2015  (KR) .................. 10-2015-0006857
May 18, 2015  (KR) .................. 10-2015-0068766

(51) Int. Cl.
*G06F 21/00* (2013.01)
*H04L 29/06* (2006.01)

(52) U.S. Cl.
CPC ............ *H04L 63/10* (2013.01); *H04L 63/101* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 6,785,726 B1* | 8/2004 | Freeman | .................. | G06F 9/542 709/227 |
| 2004/0242209 A1* | 12/2004 | Kruis | .................... | H04W 4/24 455/414.1 |
| 2005/0257266 A1* | 11/2005 | Cook | ...................... | G06F 8/61 726/23 |

(Continued)

OTHER PUBLICATIONS

Khandelwal, Ankita; Mohapatra, A K. An Insight into the Security Issues and Their Solutions for Android Phones. 2015 2nd International Conference on Computing for Sustainable Global Development (INDIACom). http://ieeexplore.ieee.org/stamp/stamp.jsp?arnumber=7100230.*

(Continued)

*Primary Examiner* — Jeremiah Avery
(74) *Attorney, Agent, or Firm* — McAndrews Held & Malloy, Ltd.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method for controlling contents and an electronic device thereof are provided. An operation method of an electronic device includes the operations of setting an access authority for one or more contents, if there is a request for an access of at least one application to the contents, resetting the access authority for the contents, and controlling the access by the application to the contents in accordance with the reset access authority of the application for the contents.

44 Claims, 28 Drawing Sheets

(56) References Cited

U.S. PATENT DOCUMENTS

| | | | |
|---|---|---|---|
| 2007/0074034 A1* | 3/2007 | Adams | G06F 21/629 |
| | | | 713/176 |
| 2007/0079356 A1* | 4/2007 | Grinstein | H04L 63/08 |
| | | | 726/2 |
| 2010/0185854 A1 | 7/2010 | Burns et al. | |
| 2010/0186062 A1 | 7/2010 | Banti et al. | |
| 2010/0212016 A1 | 8/2010 | Dubhashi et al. | |
| 2010/0220977 A1 | 9/2010 | Kwon et al. | |
| 2011/0119486 A1* | 5/2011 | Boldyrev | H04L 63/10 |
| | | | 713/156 |
| 2011/0161551 A1 | 6/2011 | Khosravi et al. | |
| 2011/0231892 A1* | 9/2011 | Tovar | H04L 63/10 |
| | | | 726/1 |
| 2013/0007468 A1 | 1/2013 | Kang et al. | |
| 2013/0054962 A1* | 2/2013 | Chawla | H04L 9/321 |
| | | | 713/156 |
| 2013/0060661 A1 | 3/2013 | Block et al. | |
| 2013/0091564 A1* | 4/2013 | Fitzgerald | G06F 21/88 |
| | | | 726/17 |
| 2013/0145439 A1 | 6/2013 | Lee | |
| 2014/0013400 A1* | 1/2014 | Warshavsky | H04L 63/102 |
| | | | 726/4 |
| 2014/0173747 A1 | 6/2014 | Govindaraju | |
| 2014/0208266 A1* | 7/2014 | Desai | G06F 3/0482 |
| | | | 715/810 |
| 2014/0373104 A1* | 12/2014 | Gaddam | H04L 63/105 |
| | | | 726/4 |
| 2015/0058931 A1* | 2/2015 | Miu | H04L 63/126 |
| | | | 726/3 |
| 2015/0180894 A1* | 6/2015 | Sadovsky | G06F 3/0481 |
| | | | 726/22 |

OTHER PUBLICATIONS

Shu-Qing, Zeng; Jie-Bin, Xu. The Improvement of Paas Platform. 2010 First International Conference on Networking and Distributed Computing (ICNDC). http://ieeexplore.ieee.org/stamp/stamp.jsp?arnumber=5645419.*

Chandra, Vikas; Aitken, Rob. Mobile Hardware Security. 2014 IEEE Hot Chips 26 Symposium (HCS). http://ieeexplore.ieee.org/stamp/stamp.jsp?arnumber=7478796.*

* cited by examiner

METHOD FOR CONTROLLING CONTENTS AND ELECTRONIC DEVICE THEREOF

RELATED APPLICATION(S)

The present application is related to and claims priority under 35 U.S.C. § 119(a) to a Korean Patent Application filed in the Korean Intellectual Property Office on Jan. 14, 2015 and assigned Serial No. 10-2015-0006857, and a Korean Patent Application filed in the Korean Intellectual Property Office on May 18, 2015 and assigned Serial No. 10-2015-0068766, the contents of which are herein incorporated by reference.

BACKGROUND

The present disclosure relates to controlling an access authority of an application for contents.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In a mobile communication terminal, a user may additionally install an external application performing a specific function in addition to applications embedded in an electronic device. In case of additionally installing the external application, the external application requests, at its installation, the user to provide an access authority for contents, so as to access the user's contents. In case that the application requests for the access authority for the contents, there may be a case where the purpose for application's requesting for the access authority for the contents is unclear. Also, there may be a case where it is difficult for the user to know whether the access authority requested by the application is necessary for which function of the application. Also, there may be a case where, owing to the access authority, although an operation unwanted by the user is generated, the user may have difficulty in recognizing the unwanted operation. As such, the electronic device cannot install the corresponding application if the user denies the access authority request. Accordingly, there is a need for a method for, even while installing an application requesting for an access authority, controlling the access authority of the corresponding application.

SUMMARY

One exemplary embodiment of the present disclosure provides an apparatus and method for controlling an access authority of an application to contents.

Another exemplary embodiment of the present disclosure provides an apparatus and method for controlling an access authority of an application having no direct access authority.

An electronic device according to an exemplary embodiment of the present disclosure includes a control unit to set an access authority for contents and, if there is a request for an access by an application to the contents, reset the access authority for the contents, and control the access by the application to the contents in accordance with the access authority that has been reset for the contents, and a display unit to display a result of controlling the access by the application.

An operation method of an electronic device according to an exemplary embodiment of the present disclosure includes the operations of setting an access authority for contents, if there is a request for an access by an application to the contents, resetting the access authority for the contents, and controlling the access by the application to the contents in accordance with the access authority that has been reset for the contents.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

Embodiments of the present disclosure will be described herein below with reference to the accompanying drawings. In describing the present disclosure, well-known functions or constructions are not described in detail since they would obscure the disclosure in unnecessary detail.

Below, the present disclosure describes a technology for contents control. In the following description, an electronic device may include at least one of a smart phone, a tablet Personal Computer (PC), a mobile phone, a video phone, an electronic book (e-book) reader, a desktop Personal Computer, a Laptop Personal Computer, a netbook computer, a Personal Digital Assistant (PDA), a Portable Multimedia Player (PMP), an MPEG Audio Layer-3 (MP3) player, a mobile medical instrument, a camera, or a wearable device (e.g., a Head-Mounted Device (HMD) such as electronic glasses, electronic clothes, an electronic bracelet, an electronic necklace, an electronic appcessory, an electronic tattoo, or a smart watch).

Figure 1:
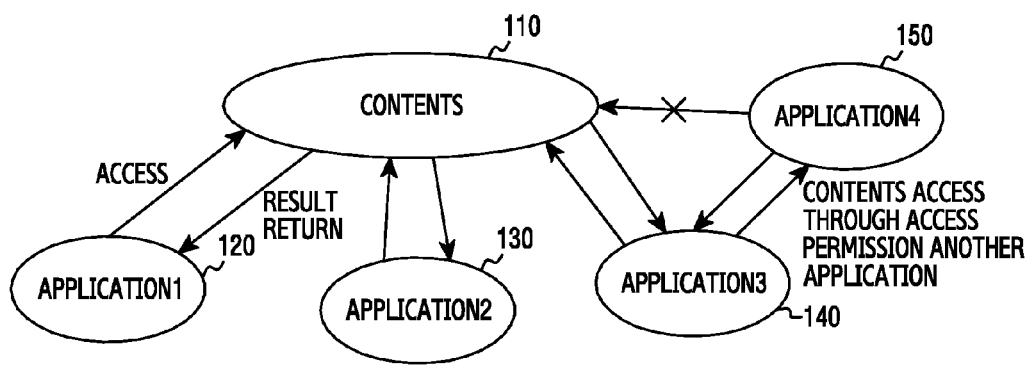
FIG. 1 illustrates an example of a contents access scheme in an electronic device.

FIG. 1 illustrates an example of a contents access scheme in an electronic device.

Referring to FIG. 1, applications 120, 130, and 140 each may attempt to access to contents 110. If the applications 120, 130, and 140 each hold access authorities for the contents 110, the applications 120, 130, and 140 each may use the contents 110.

Assuming that a specific application 150 holds no access authority for the contents 110, the specific application 150 may access the contents 110 through another application 140 for which access is permitted. If using the aforementioned method, because even the specific application 150 holding no access authority is accessible to the contents 110, a problem may occur in which information may be leaked or compromised with a user not recognizing the information leakage. To solve this problem, one exemplary embodiment of the present disclosure may check access authorities of another application 140 for which access is permitted and the specific application 150 having sent an access request to another application 140, and perform control according to the access authorities.

Figure 2A:
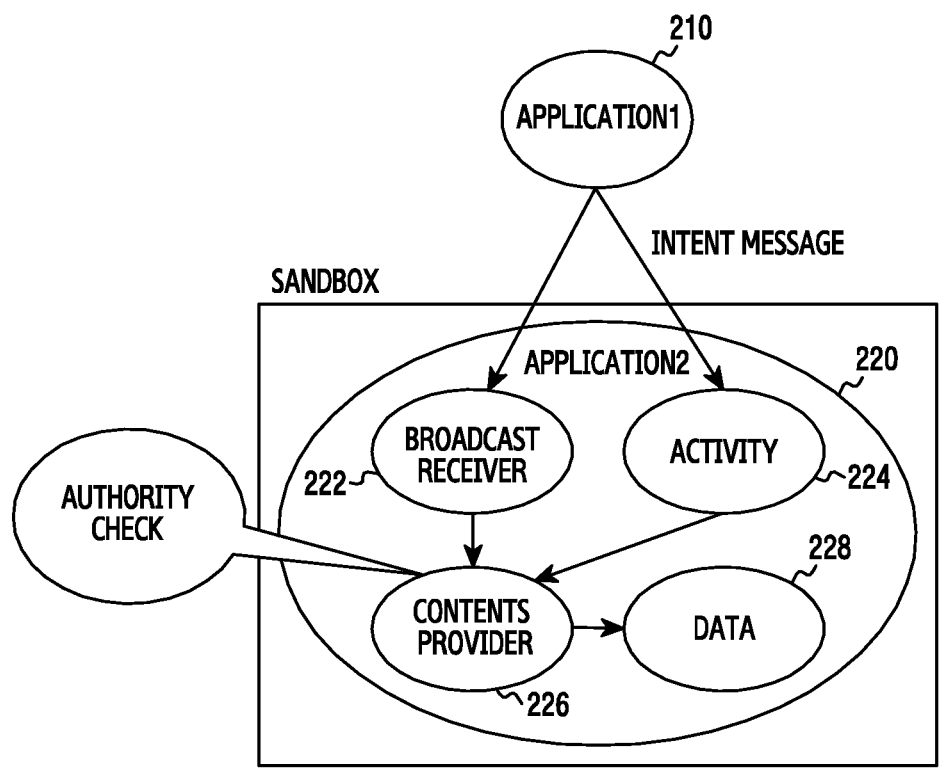
FIG. 2A and FIG. 2B illustrate an example of a scheme of accessing to a specific application in an electronic device.
Figure 2B:
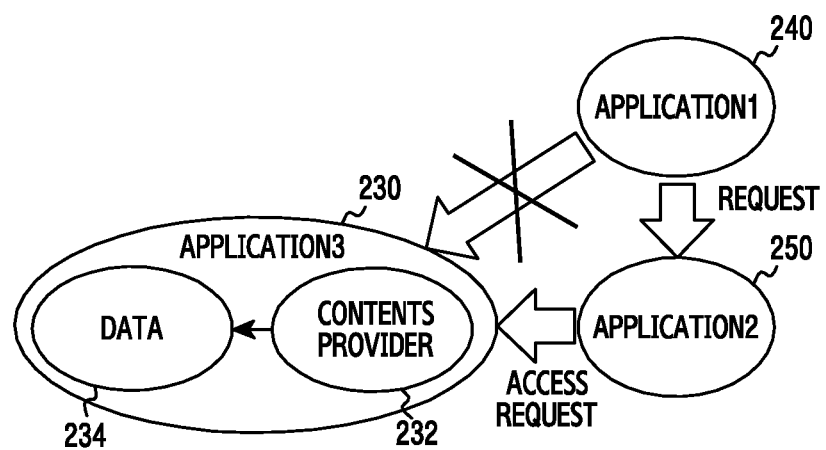

FIG. 2A and FIG. 2B illustrate an example of a scheme of accessing to a specific application in an electronic device.

Referring to FIG. 2A, a second application 220 may exist in a sandbox form. The second application 220 may operate within a Linux process, and use only its own allocated resources. The second application 220 may include constituent elements such as a broadcast receiver 222, an activity 224, and a contents provider 226. The broadcast receiver 222 may provide a method for forwarding a message between respective constituent elements. The activity 224 may process a user input. The contents provider 226 may allow a first application 210 to use a database of the second application 220.

In case that the first application 210 intends to access to the second application 220, the access to the second application 220 may use Inter-Process Communication (IPC). In this case, the first application 210 attempting access may perform a desired function, or send an intent to an application having desired data.

In case that the first application 210 forwards a message to the second application 220 to which the first application 210 intends to access, the message may be forwarded to the contents provider 226 through the broadcast receiver 222. If the first application 210 sends an intent message to the second application 220, the intent message may be forwarded to the contents provider 226 through the activity 224. Upon receiving an access request from the first application 210, the contents provider 226 may check an authority of the first application 210 having attempted access. Thereafter, in case that the first application 210 having attempted the access holds an access authority for data 228, the contents provider 226 may permit the access of the first application 210 to data 228.

Referring to FIG. 2B, a first application 240 may access to a third application 230 through a second application 250. In case that the first application 240 does not hold an authority of access to the third application 230 intended to be accessed, the first application 240 may attempt access to the third application 230 through the second application 250 holding the authority of access to the third application 230. In case that there is an access request of the first application 240, a contents provider 232 of the third application 230 may regard the access request of the first application 240 as an access request of the second application 250 for which access is permitted, and permit the access of the first application 240 to data 234 Accordingly, although the second application 250 having sent an access request holds an access authority for the data 234, there is a need to determine whether the second application 250 attempts to access to the third application 230 through an access request of the first application 240. If the second application 250 attempts to access to the third application 230 through the access request of the first application 240, there is a need to check an access authority of the first application 240, and block an access of the first application 240 in accordance with the checking result.

Figure 3:
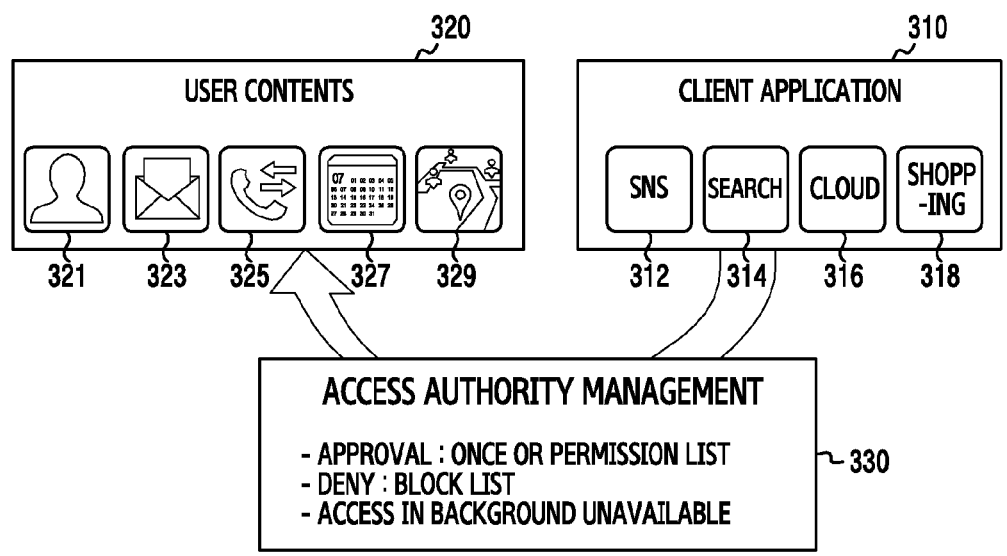
FIG. 3 illustrates a contents access authority management technique according to an exemplary embodiment of the present disclosure.

FIG. 3 illustrates a contents access authority management technique according to an exemplary embodiment of the present disclosure.

Referring to FIG. 3, a client application 310 may include various applications including a Social Networking Service (SNS) application 312, a search application 314, a cloud application 316, and a shopping application 318. The various applications of the client application 310 may attempt to access to contents 321, 323, 325, 327, and 329 of user contents 320, respectively. According to an exemplary embodiment of the present disclosure, in case that the various applications of the client application 310 attempt to access to the contents 321, 323, 325, 327, and 329 of the user contents 320, respectively, an electronic device may manage access authorities of the various applications at block 330.

For example, the electronic device may add an access authority of a specific application to an once-permission or permission list, or add the access authority of the specific application to a block list, or add the access authority of the specific application such that background access is unavailable.

According to another exemplary embodiment of the present disclosure, the electronic device may add an access authority of a specific application to a once-permission or permission list, or add the access authority of the specific application to an always permission list. Or, in case that the specific application attempts to access to specific contents, the electronic device may compulsorily stop the specific application or delete the specific application.

Figure 4:
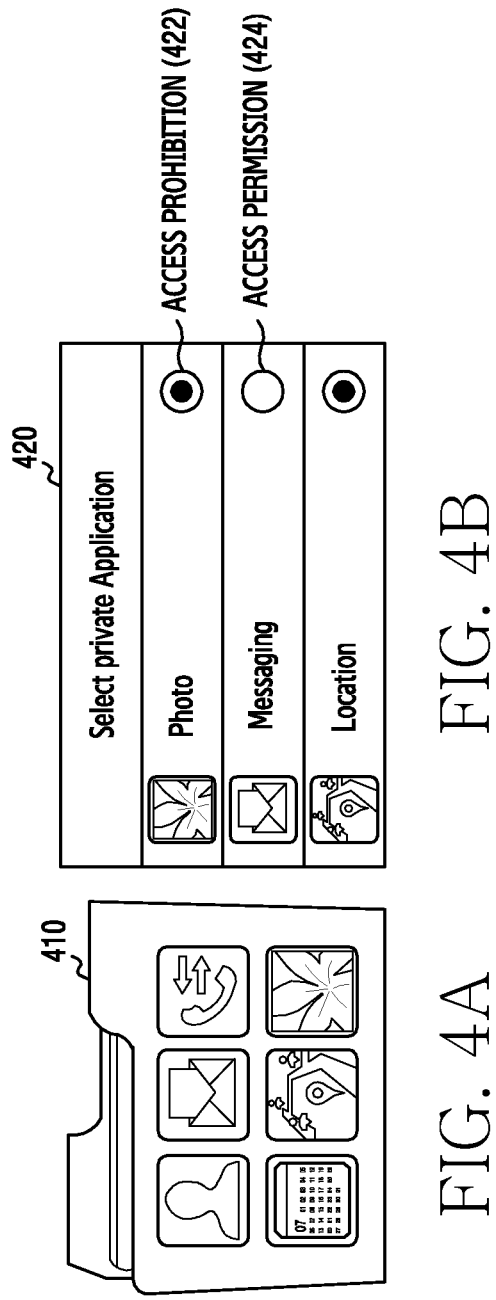
FIG. 4A and FIG. 4B illustrate an example of designating access control target contents according to an exemplary embodiment of the present disclosure.

FIG. 4A and FIG. 4B illustrate an example of designating access control target contents according to an exemplary embodiment of the present disclosure.

A method for contents control according to an exemplary embodiment of the present disclosure may designate contents whose access will be controlled. The contents control method for designating the contents whose access will be controlled may be a system automatic designation method or a user selection designation method. In case of using the system automatic designation method, an electronic device may automatically designate a list of basic private applications and notify this to a user. If the user agrees to the designated private application list, the private application list may be designated as management target contents.

Or, in case of using the user selection designation method, the user may directly designate a list of basic private applications, and may perform collective access prohibition designation or access prohibition cancelation for the designated contents. Even individual access prohibition designation or access prohibition cancelation is available.

Referring to FIG. 4A and FIG. 4B, the user may designate the management target contents through the user selection designation method. FIG. 4A illustrates an example of designating the private application list. The user may add contents, which will be designated as the management target contents, to a management target folder and manage a list of management target contents 410. According to one exemplary embodiment, the user may add an application to the list of management target contents 410 through a drag scheme. Alternatively, the user may remove an application from the list of management target contents 410 through the drag scheme. FIG. 4B illustrates an example of access setting in the list of management target contents 410. The user may designate contents to be access prohibition 422 or access permission 424 by the collective designation or the individual designation, as denoted by reference numeral 420 of FIG. 4B.

Figure 5:
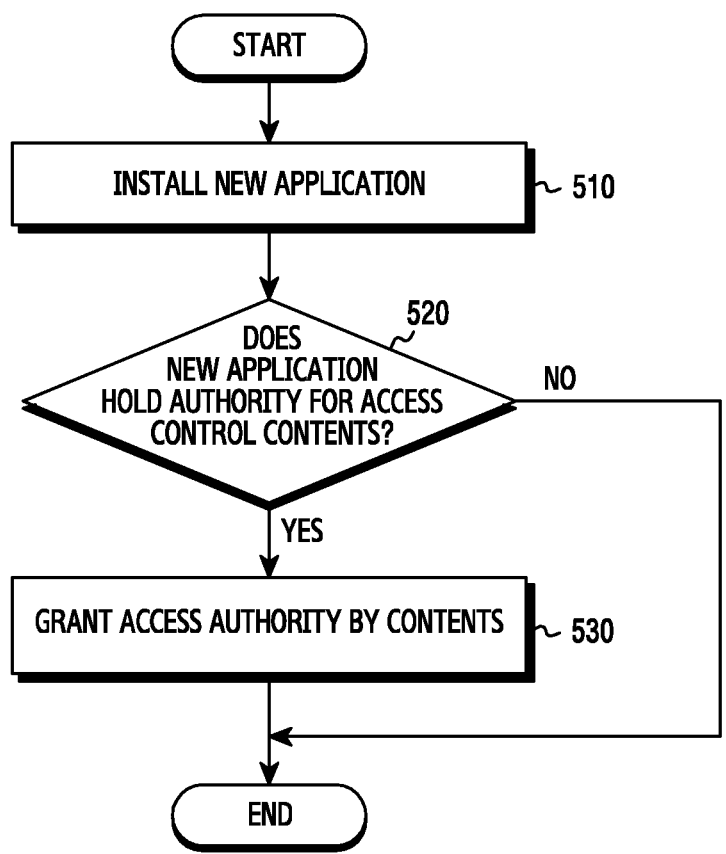
FIG. 5 illustrates a flow of an operation of granting an access authority for contents according to an exemplary embodiment of the present disclosure.

FIG. 5 illustrates a flow of an operation of granting an access authority for contents according to an exemplary embodiment of the present disclosure.

In case that a user installs an application, except for applications that do not request an access authority for contents in an electronic device, if the user does not agree to the access authority request of the application, the user may not install the application in the electronic device. Therefore, the user has to agree to the access authority request of the application. Accordingly, in case that a new application is installed in step 510, the installed application may be granted an access authority for specific contents to acquire the access authority from the user.

In step 520, the electronic device may determine if the installed application holds an access authority for access control contents. In detail, the electronic device may determine if the installed application holds an access authority for contents included in a management target contents list. If the installed application holds the access authority for the contents, in step 530, the electronic device may reset the access authority of the installed application for the contents.

For concrete example, in case that the Social Networking Service (SNS) application 312 illustrated in FIG. 3 is newly installed and, in the installation operation, requests and acquires an access authority for the contents 321 and 323, if the SNS application 312 accesses to the contents 321 or 323, the electronic device may reset an access authority level of the SNS application 312 for the contents 321 or 323.

For another example, in case that the access prohibition 422 of the installed application for contents included in the list of management target contents 410 is set as illustrated in FIG. 4A and FIG. 4B, the electronic device may reset the access prohibition 422 of the installed application for the list of management target contents 410.

Figure 6A:
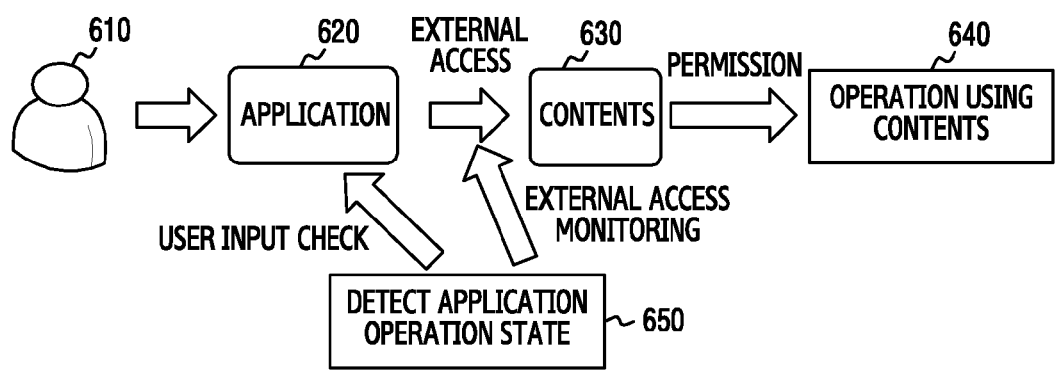
FIG. 6A and FIG. 6B illustrate an example of access control at the time of user direct input according to an exemplary embodiment of the present disclosure.
Figure 6B:
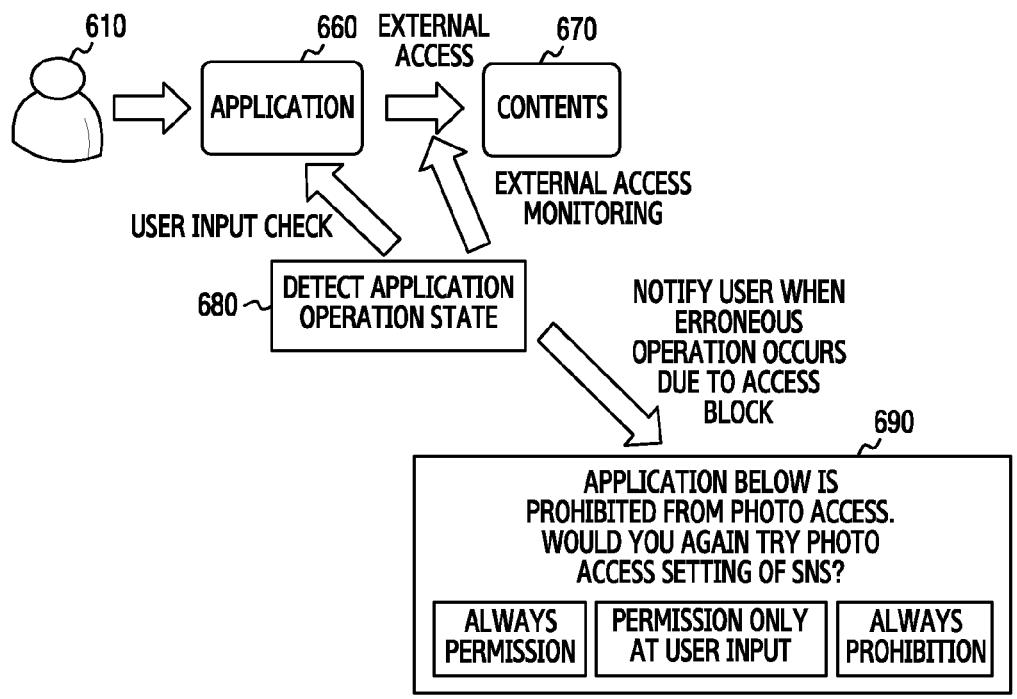

FIG. 6A and FIG. 6B illustrate an example of access control at the time of user direct input according to an exemplary embodiment of the present disclosure.

According to one exemplary embodiment of the present disclosure, an electronic device may perform application access control dependent on the presence or absence of user input. In case that the application requests access to the management target contents 410, if checking that the application accesses to the management target contents 410 through user input, the electronic device may permit the access by the application to the management target contents 410.

FIG. 6A illustrates an example of a case where an application accesses to contents through a user input. For example, an application 620 illustrated in FIG. 6A may be an SNS application (e.g., the SNS application 312 of FIG. 3), and contents 630 may be photos. According to one exemplary embodiment of the present disclosure, in case that a user 610 may directly access to the contents 630 through the installed application 620, the electronic device may detect an application operation state as denoted by reference numeral 550.

In detail, the electronic device may determine if the access by the application accessing to the contents 630 is an access to the contents 630 through an external application. If it is determined that the access by the application 620 is the access through the external application, the electronic device may check a user input. If the user input is checked, the electronic device may permit the access by the application 620 to the contents 630. According to illustration of FIG. 6A, in case that the application 620 accesses to the contents 630, if the user input is checked, the electronic device may permit the access by the application 620 to the contents 630. Accordingly to this, the application 620 may access to the contents 630 and then perform an operation 640 using the contents 630. For example, in an exemplary embodiment of FIG. 6A, the application 620 may perform an operation related with the contents 630. For example, the application 620 may upload photo contents to a web.

Even in case that an access authority of a specific application is set as "Access block" (or "Access denial") in accordance with the access authority management 330 illustrated in FIG. 3, in a specific case, the electronic device may permit the access of the specific application of which the access authority is set as "Access block" to specific contents. According to one exemplary embodiment of the present disclosure, although the access authority of the application is set as "Access block," in case that a user directly accesses to the contents through the application of which the access authority is set as "Access block," the electronic device may set to permit the access by the application to the contents.

FIG. 6B illustrates an exemplary embodiment of control to prevent an erroneous operation caused by authority resetting. FIG. 6A assumes an example of, in case that the user directly accesses through the application 620, always permitting the access. Compared with FIG. 6A, FIG. 6B assumes an example of a case where a user 610 directly accesses to contents 670 through an application 660 having been set as "Access block."

For example, FIG. 6B illustrates an example of a case where the application 660 is in the form of an SNS application (e.g., the SNS application 312 of FIG. 3) having been set as "Access block" accesses to the contents 670 in the form of photos. According to one exemplary embodiment of the present disclosure, in case that the user 610 accesses to the contents 670 through the application 660 having been set as "Access block," the electronic device may detect an application operation state 680. At this time, in case that an erroneous operation occurs due to "Access block" in accordance with the application operation state 680, the electronic device may notify this to the user 610.

In detail, the electronic device may determine if the access by the application 660 accessing to the contents 670 is an access to the contents 670 through an external application. If it is determined that the access by the application 660 is the access through the external application, the electronic device may check a user input. If the user input is checked, the electronic device may permit the access by the application 660 to the contents 670. According to illustration of FIG. 6B, in case that the application 660 having been set as "Access block" accesses to the contents 630, if the user input is checked, the electronic device may notify the user 610 that the access to the contents 630 is prohibited and send the user 610 a request for resetting the access setting of the application 660 having been set as "Access block," as denoted by reference numeral 690. According to one exemplary embodiment of the present disclosure, the user 610 may select one of "Always permission," "Permission only at user input," and "Always prohibition," and again perform the access setting of the application 660. If the user 610 selects "Always permission," an access authority of the application 660 having been set as "Access block" may be changed into "Access permission." If the user 610 selects "Permission only at user input," the application 660 having been set as "Access block" may be changed to be basically set as "Access block" and, only when a user input is checked, access to the contents 670. Also, in case that the user 610 selects "Always prohibition," the application 660 having been set as "Access block" is set as "Always access block" against the contents 670 irrespective of the presence or absence of user input.

Figure 7A:
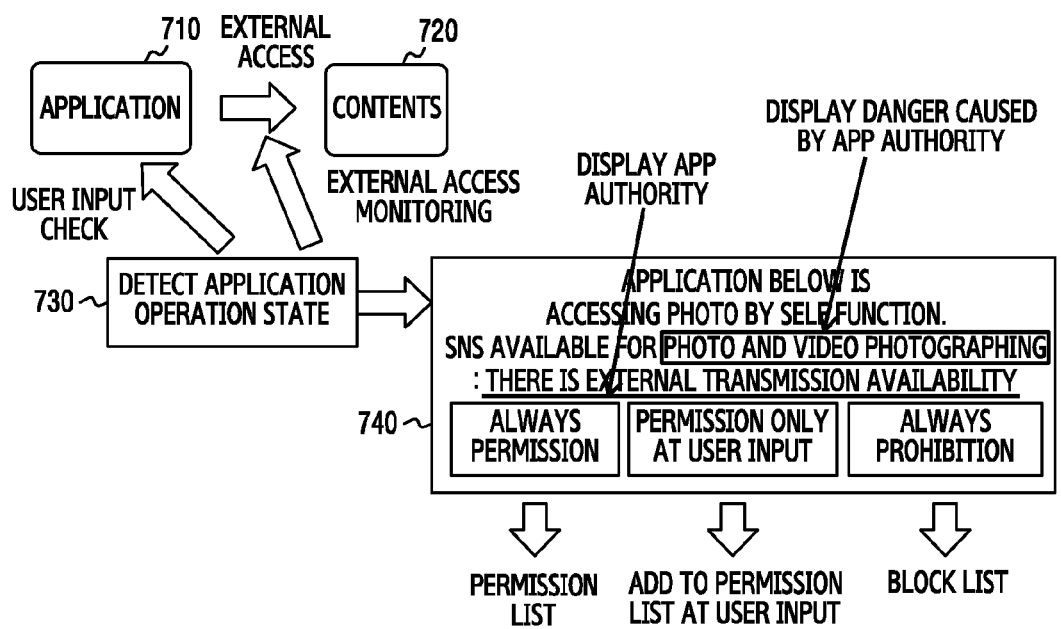
FIG. 7A and FIG. 7B illustrate an example of access control at the time of background input according to an exemplary embodiment of the present disclosure.
Figure 7B:
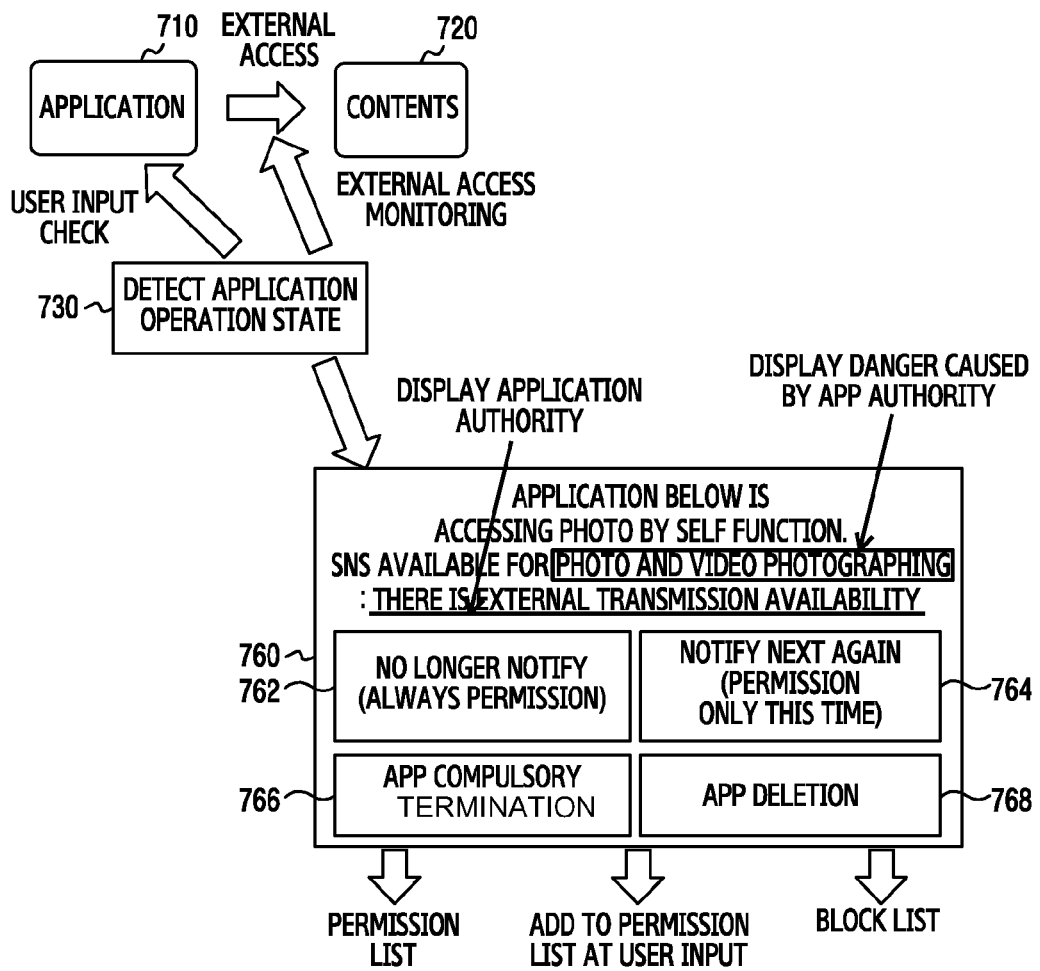

FIG. 7A and FIG. 7B illustrate an example of access control at the time of background input according to an exemplary embodiment of the present disclosure.

In an electronic device, even in case that there is no user input, an application may attempt to access to contents. The present disclosure calls a case where the application accesses to the contents without this user input, a background input. The presence or absence of background input may be checked by sensing user activation or inactivation through screen off, Central Processing Unit (CPU) background, etc. Also, in case that a user accesses to the contents through the application, the electronic device may determine if the application is operating a function related with the corresponding contents, and check the presence or absence of background input.

Referring to FIG. 7A, in case that a specific application accesses to specific contents, the electronic device may detect an operation state of the specific application. If the specific application operates without a user input, the electronic device may notify the user that the specific application accesses to the contents by a self-function, and request the user to set an access authority of the specific application.

In an example of FIG. 7A, the application 710 may be an SNS application (e.g., the SNS application 312 of FIG. 3), and the contents 720 may be photo contents. In case that the application 710 having been set as "Access block" accesses to the contents 720, the electronic device may detect an application operation state 730 and determine if the access by the application 710 is an access through a user input. Otherwise, the electronic device may determine that the access by the application 710 is an access through a background input, and display an access message 740 using the background input, to a user. For one example, the access message 740 may display "application is accessing to contents by a self-function" and also, may display an authority of the application 710 and a danger caused by the authority of the application 710. In the example of FIG. 7A, in case that the application 710 accesses to the contents 720 by the background input, the access message 740 may display that the application 710 is available for photo and video photographing, and display the authority (e.g., transmission to the outside) of the application 710. Accordingly to this, the user may set the access authority of the application 710 by selecting one of "Always permission," "Permission only at user input," and "Always prohibition." In case that the user sets the access authority of the application 710 for the contents 720 as "Always permission," the access authority of the application 710 for the contents 720 changes from access block to access availability. If the user changes the access authority of the application 710 into "Permission only at user input," the electronic device may add the application 710 to a background block list to block the access by the application 710 when the application 710 accesses to the contents 720 later through the background input. Also, in case that the user sets the access authority of the application 710 as "Always prohibition," the application 710 may be set to always block the access by the application 710 irrespective of the presence or absence of user input and background input.

According to an exemplary embodiment of the present disclosure, in an example of FIG. 7B, in case that the application 710 having been set as "Access block" accesses to the contents 720, the electronic device may detect an application operation state 730 and determine if the access by the application 710 is an access through a user input. Otherwise, the electronic device may determine that the access by the application 710 is an access through a background input, and display an access message 760 using the background input, to a user. For one example, the access message 760 may display "application is accessing to contents by a self-function" and also, may display an authority of the application 710 and a danger caused by the authority of the application 710. In the example of FIG. 7B, in case that the application 710 accesses to the contents 720 by the background input, the access message 760 may display that the application 710 is available for photo and video photographing, and display the authority (e.g., transmission to the outside) of the application 710. Accordingly to this, in case that the application 710 accesses to the contents 720, the electronic device may display the access message 760 to the user such that the user may control the application 710. The access message 760 may be a screen including "Always permission" 762, "Permission only this time" 764, "App compulsory termination" 766, and "App deletion" 768 options.

In case that the user selects the "Always permission" 762 option, the electronic device may always permit the access by the application 710 to the contents 720 and no longer notify that the application 710 accesses to the contents 720.

If the user selects the "Permission only this time" 764 option, the electronic device may once permit the access by the application 710. In case that the user selects "Permission only this time" 764 option, when the application 710 accesses the contents 720 later, the electronic device may again display the access message 760 to the user.

If the user selects the "App compulsory termination" 766 option, the electronic device may stop the application 710. Also, if the user selects the "App deletion" 768 option, the electronic device may delete the application 710.

The aforementioned exemplary embodiment of the present disclosure provides an example of a case where an application is an SNS application (e.g., the SNS application 312 of FIG. 3) and contents are photo contents, but this is for description convenience, and it should be noted that the scope of the exemplary embodiment of the present disclosure is not limited only to the SNS application (e.g., the SNS application 312 of FIG. 3) and the photo contents, but may be applied even to other applications and other contents.

Figure 8:
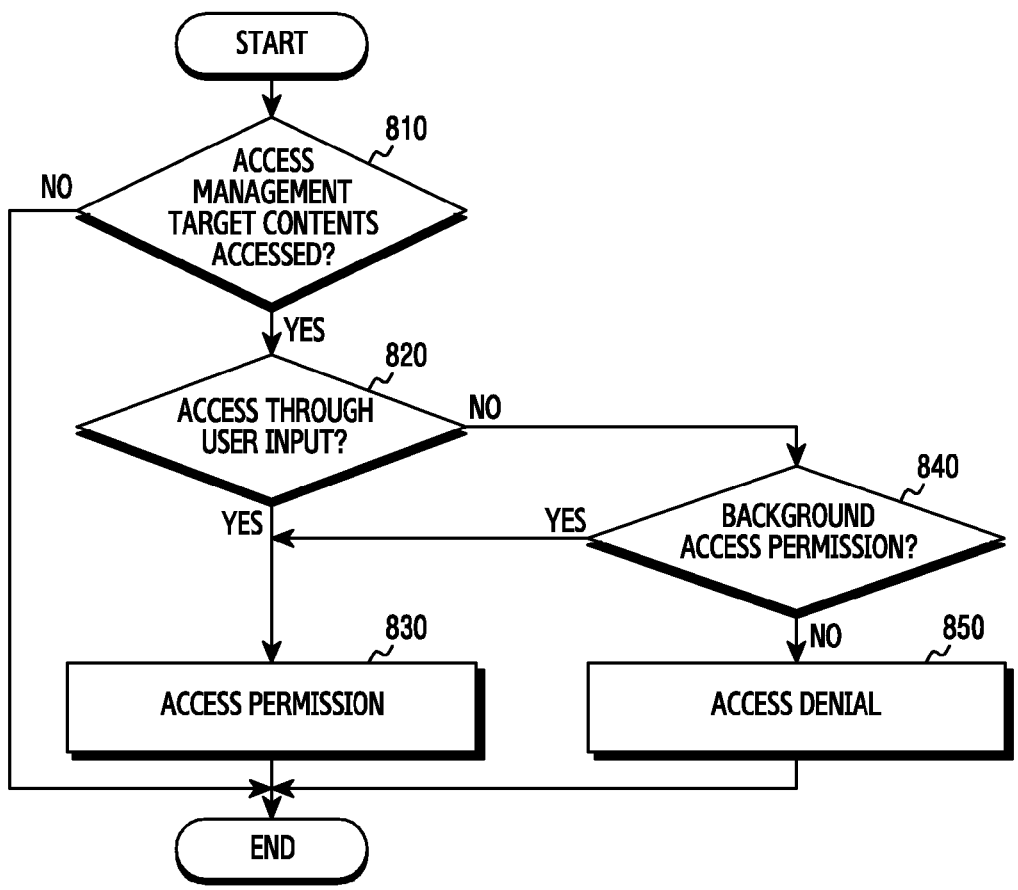
FIG. 8 illustrates a flow of an operation of contents access control according to the presence or absence of user input and background input according to an exemplary embodiment of the present disclosure.

FIG. 8 illustrates a flow of an operation of contents access control according to the presence or absence of user input and background input according to an exemplary embodiment of the present disclosure.

In step 810, an electronic device may determine if an application accesses to access control (or management) target contents. If the application accesses to contents not being an access control target, the electronic device may not perform the contents access control.

In case that the application accesses to the access control target contents, in step 820, the electronic device may determine if the access by the application is an access through a user input. If the access by the application is the access through the user input, in step 830, the electronic device permits the access by the application.

In case that the application accesses to the access control target contents, in case that the access by the application is not the access through the user input, for example, in case that it is a contents access through a background input, in step 840, the electronic device may determine if the contents access through the background input is permitted. If the contents access through the background input is blocked, the electronic device may proceed to step 850 and block the access by the application. If the contents access through the background input is permitted, the electronic device may proceed to step 830 and permit the access by the application to the contents.

Figure 9:
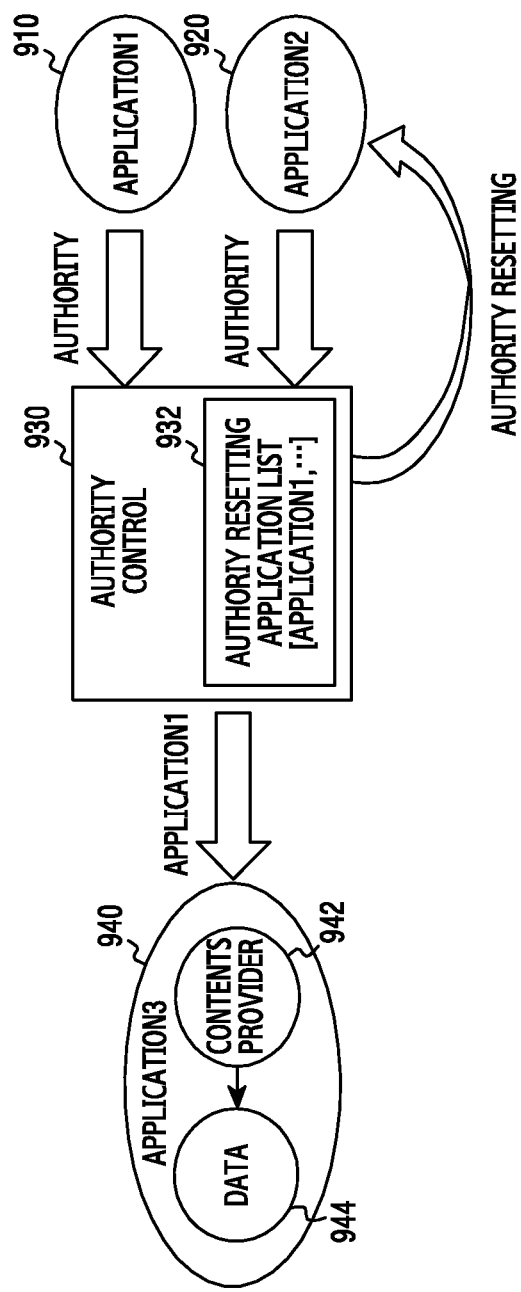
FIG. 9 illustrates an example of resetting an access authority of an application for contents according to an exemplary embodiment of the present disclosure.

FIG. 9 illustrates an example of resetting an access authority of an application for contents according to an exemplary embodiment of the present disclosure.

In case that a specific application accesses to specific contents, an electronic device may determine if an access authority is reset to the application, and may control contents access in accordance with the resetting or non-resetting. The resetting of the access authority of the application may be performed after of installation of a new application having an access authority or upon occurrence of access by the application to designated contents.

Referring to FIG. 9, in case that a first application 910 and a second application 920 attempt to access to data 944 of a third application 940, the electronic device may determine if access authorities of the first application 910 and the second application 920 have been reset. In case that the access authorities of the first application 910 and the second application 920 have been reset, the electronic device may check the presence or absence of the reset access authorities of the first application 910 and the second application 920 for contents. In case that the reset access authorities exist, the electronic device may permit the access by the first application 910 and the second application 920 to the data 944. In an example of FIG. 9, the electronic device may perform authority control 930 to determine the presence or absence of resetting of the access authorities of the first application 910 and the second application 920 through an authority resetting application list 932. In the example of FIG. 9, assuming that the access authority of the second application 920 has not been reset, the electronic device may control to reset the access authority of the second application 920 having attempted the access. In contrast, in case that the access authority of the first application 910 is reset and the reset access authority is permitted for contents access, the first application 910 may access the data 944 via a contents provider 942 of the third application 940.

Figure 10:
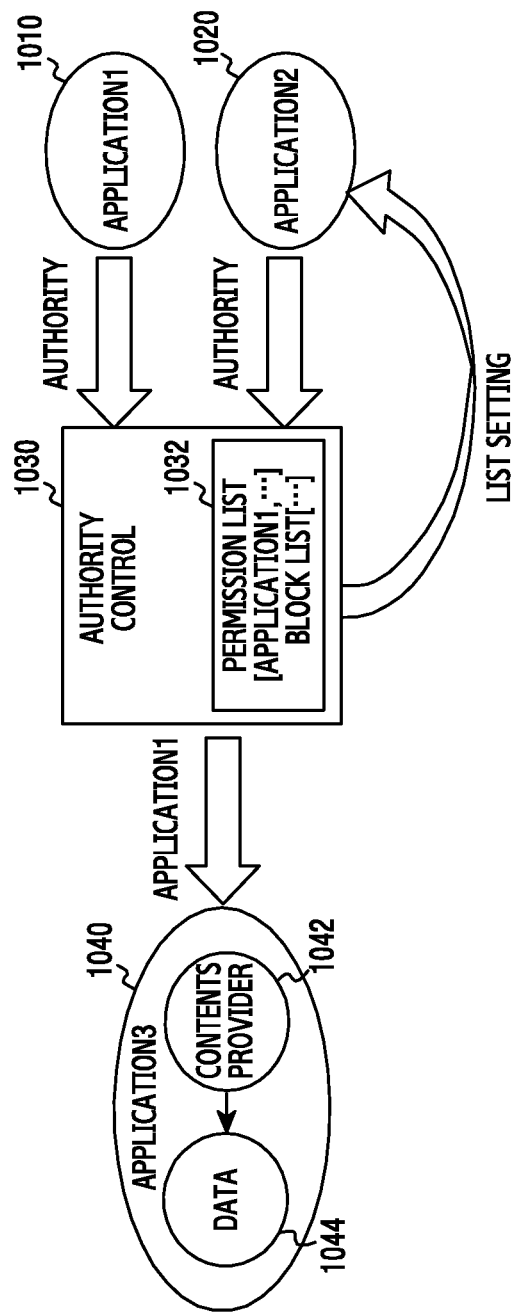
FIG. 10 illustrates an example of managing an access list by contents according to an exemplary embodiment of the present disclosure.

FIG. 10 illustrates an example of managing an access list by contents according to an exemplary embodiment of the present disclosure.

In case that a specific application accesses to specific contents, an electronic device may determine if the application holds an access authority for the specific contents, and may control contents access in accordance with the presence or absence of the access authority.

Referring to FIG. 10, in case that a first application 1010 and a second application 1020 attempt to access to data 1044 of a third application 1040, the electronic device may check access authorities of the first application 1010 and the second application 1020. In case that the access authorities of the first application 1010 and the second application 1020 exist, the electronic device may permit the access by the first application 1010 and the second application 1020 holding the access authorities to the data 1044. In an example of FIG. 10, the electronic device may perform authority control 1030 to check a access permission list that has previously been stored, and block list 1032 and determine the presence or absence of the access authorities of the first application 1010 and the second application 1020. In the example of FIG. 10, assuming that the access authority of the second application 1020 for the data 1044 of the third application 1040 has not been set, the electronic device may control to set the access authority of the second application 1020 having attempted the access and add the access authority of the second application 1020 to the permission or block list. In contrast, in case that the access authority of the first application 1010 is permitted for the data 1044, the first application 1010 may access the data 1044 via a contents provider 1042 of the third application 1040.

Figure 11:
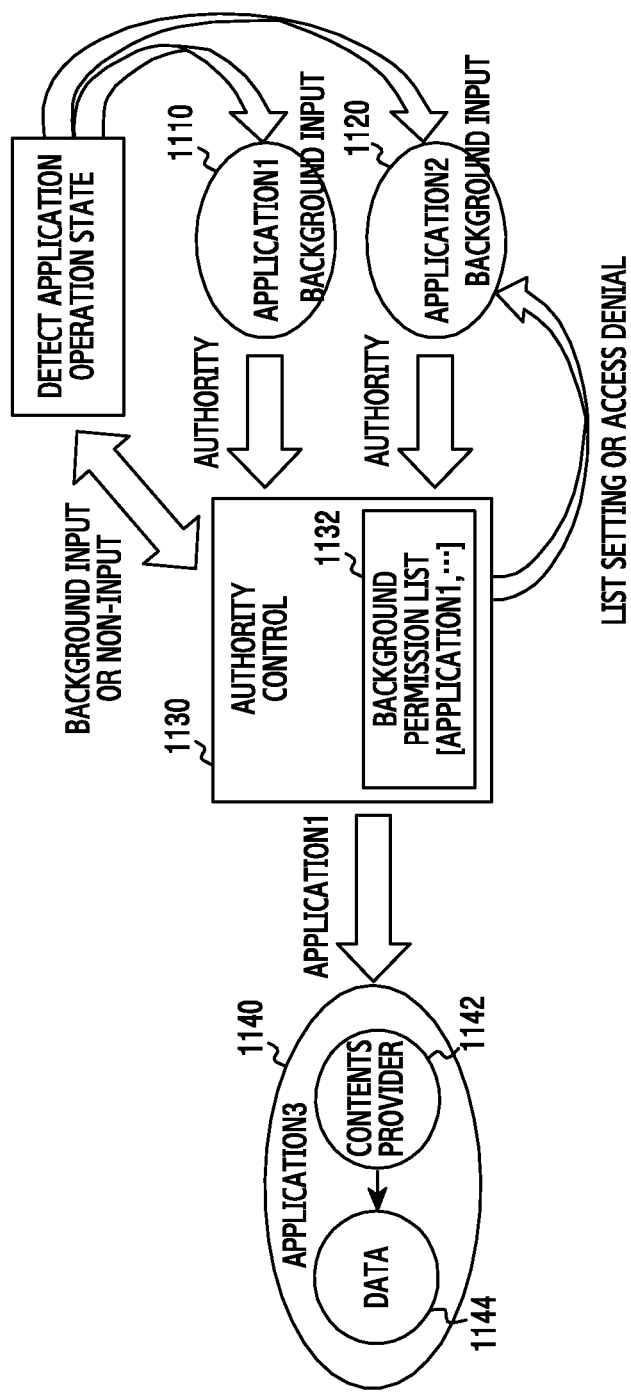
FIG. 11 illustrates an example of managing a background permission/block list according to an exemplary embodiment of the present disclosure.

FIG. 11 illustrates an example of managing a background permission/block list according to an exemplary embodiment of the present disclosure.

In case that a specific application accesses specific contents, an electronic device may determine if the application accesses the specific contents through a background input, and may control contents access in accordance with the presence or absence of the background input. The electronic device may set to make contents access through an external application available only at user input through control dependent on the presence or absence of the background input.

Referring to FIG. 11, in case that a first application 1110 and a second application 1120 attempt to access data 1144 of a third application 1140, the electronic device may check access authorities of background inputs of the first application 1110 and the second application 1120, and in case that the access authorities of the first application 1110 and the second application 1120 exist, the electronic device may permit the access by the first application 1110 and the second application 1120 holding the access authorities to the data 1144.

In an example of FIG. 11, the electronic device may perform authority control 1130 to check a background input access permission list 1132 that has been previously stored, and determine the presence or absence of the access authorities of the first application 1110 and the second application 1120. In the example of FIG. 11, assuming that the background input access authority the second application 1120 for the data 1144 of the third application 1140 has not been set, the electronic device may control to set the background input access authority of the second application 1120 having attempted the access and add the background input access authority of the second application 1120 to the background input access permission list 1132 or add the background input access authority of the second application 1120 to a background input access denial list. In contrast, in case that the background input access authority of the first application 1110 is permitted for the data 1144, the first application 1110 may access the data 1144 via a contents provider 1142 of the third application 1140.

Figure 12:
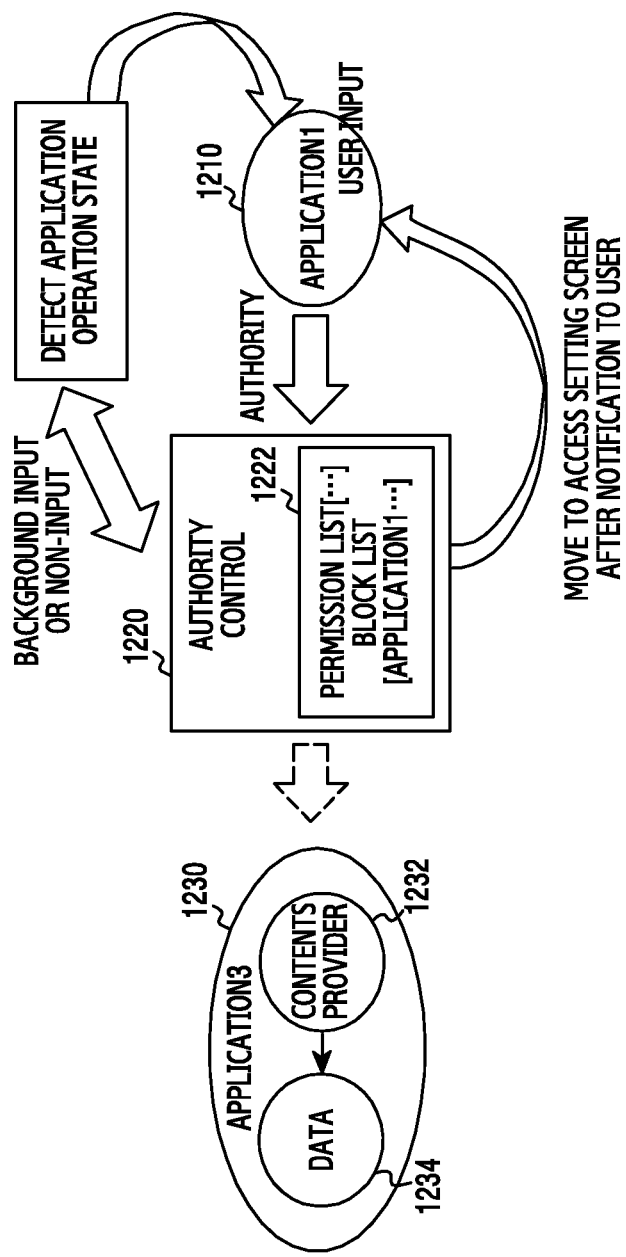
FIG. 12 illustrates an example of a case where a user directly accesses to contents through an application having been set as access prohibition according to an exemplary embodiment of the present disclosure.

FIG. 12 illustrates an example of a case where a user directly accesses to contents through an application having been set as access prohibition according to an exemplary embodiment of the present disclosure.

Even in case that a specific application having been set as "Access block" accesses to specific contents, if the access by the application is a direct access of a user, an electronic device may permit the access by the application to the specific contents Referring to FIG. 12, if a first application 1210 of which an access authority level is set as "Access block" attempts to access to data 1234 of a third application 1230, the electronic device may determine if the access of the first application 1210 is an access through a user input. If the access of the first application 1210 is the access through the user input the electronic device may permit the access of the first application 1210 to the data 1234 of the third application 1230.

In an example of FIG. 12, the electronic device may perform authority control 1220 and may check an access authority of the first application 1210 attempting the access, through previously stored access permission and block list 1222. If the access authority of the first application 1210 is set to permit the access through the user direct input, the first application 1210 may access to the data 1234 via a contents provider 1232 of the third application 1230. If the access authority of the first application 1210 has not been set to permit the access through the user direct input, the electronic device may send a user a notification for setting the access authority of the first application 1210 to permit the access through the user direct input, and may perform authority setting according to this.

Figure 13:
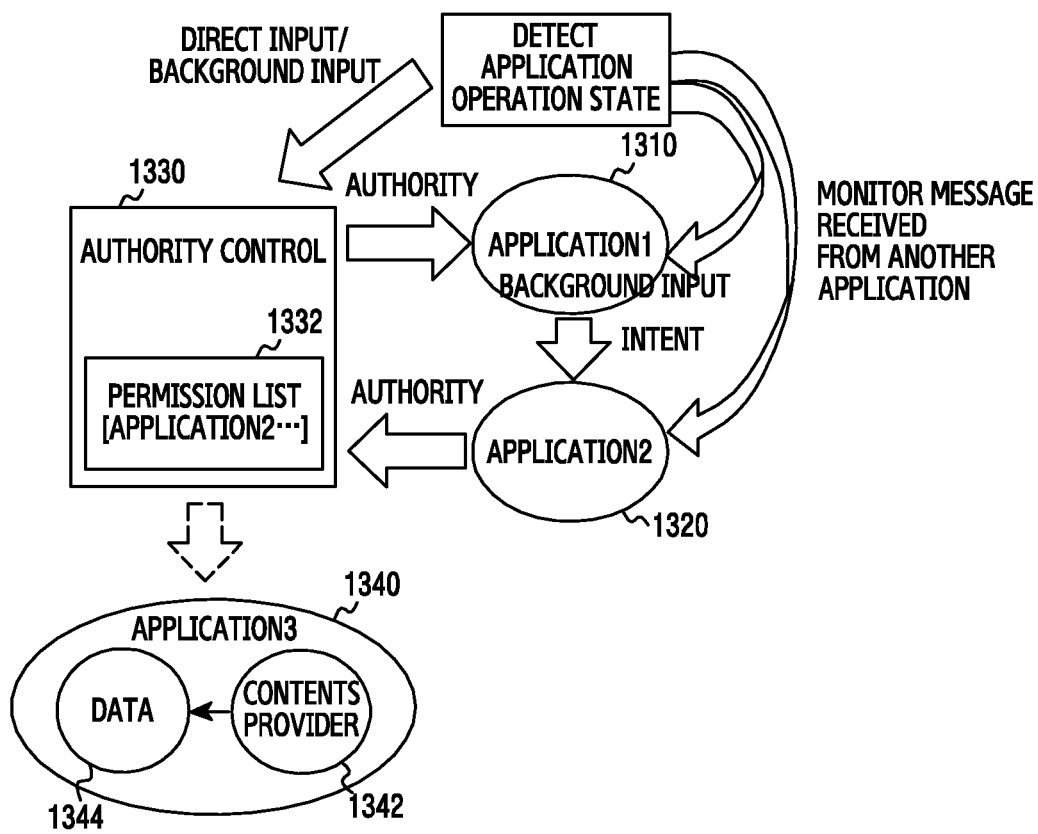
FIG. 13 illustrates an example of application control at the time of accessing to contents through another application according to an exemplary embodiment of the present disclosure.

FIG. 13 illustrates an example of application control at the time of accessing to contents through another application according to an exemplary embodiment of the present disclosure.

In case that a specific application, or a first application, accesses specific contents through another application, or a second application, if the second application holds an access authority for the specific contents, an electronic device may check the presence or absence of an access authority of the first application for the specific contents.

In an example of FIG. 13, the electronic device may perform authority control 1330, to check a previously stored access permission list 1332 and determine the presence or absence of access authorities of applications. In the example of FIG. 13, it is assumed that the second application 1320 holds an access authority for data 1344 of a third application 1340. The electronic device may determine if the access by the second application 1320 attempting the access is performed through a request of another application (i.e., the first application 1310). If the second application 1320 attempts to access the data 1344 through the request of another application (i.e., the first application 1310), the electronic device may check the presence or absence of an access authority of the first application 1310. If even the first application 1310 holds the access authority for the data 1344 or the access by the second application 1320 is performed through a user direct input, the electronic device may permit the access by the second application 1320 to the data 1344 of the third application 1340.

Figure 14:
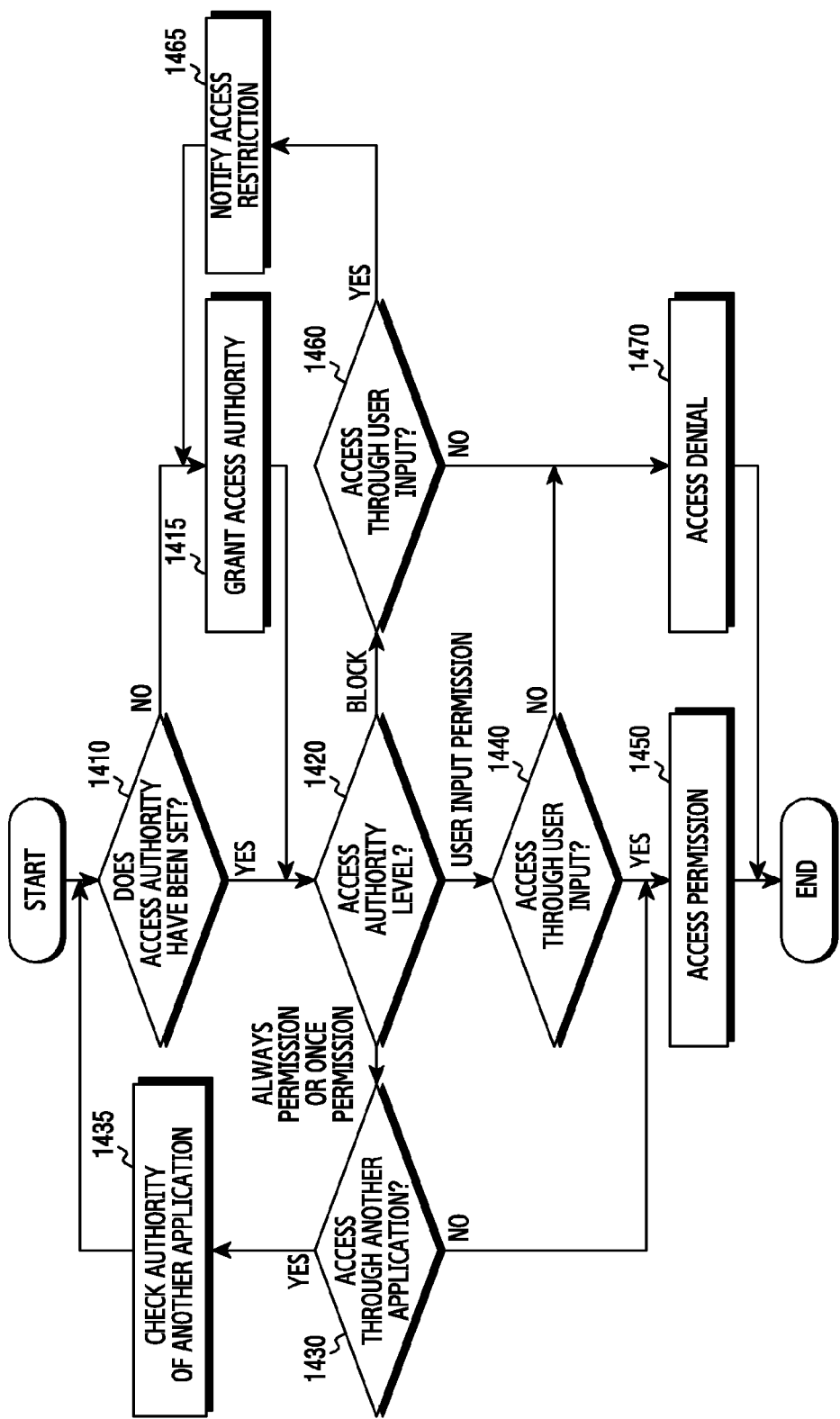
FIG. 14 illustrates a flow of an operation of access control according to contents access according to an exemplary embodiment of the present disclosure.

FIG. 14 illustrates a flow of an operation of access control according to contents access according to an exemplary embodiment of the present disclosure.

Referring to FIG. 14, in case that an application accesses to contents, in step 1410, an electronic device may determine whether an access authority of the application is set. Whether the access authority of the application is set may be determined through the previously stored authority resetting application list 932 of FIG. 9. If the access authority of the application has not been set, in step 1415, the electronic device may request a user to grant the access authority to the application.

If the access authority of the application is set, in step 1420, the electronic device may check an access authority level of the application. The access authority level may be checked through the previously stored access permission list 1332 and block list 1032 of FIG. 10.

If the access authority level of the application is set as "Always permission" or "Once permission," in step 1430, the electronic device may determine if the access by the application is an access through a request of another application. If the access by the application is the access through the request of another application, in step 1435, the electronic device may check an access authority of another application. If the access by the application is not the access through the request of another application, the electronic device may proceed to step 1450 and permit the access by the application.

If the access authority level of the application is set as "Access block," in step 1460, the electronic device may determine if the access by the application is an access through a user input. If the access by the application is not the access through the user input, the electronic device may proceed to step 1470 and deny the access by the application. If the access by the application is the access through the user input, the electronic device may proceed to step 1465 and send an access restriction notification to a user to request the user to grant the access authority to the application.

If the access authority level of the application is set as "Permission of access through user input," in step 1440, the electronic device may determine if the access by the application is the access through the user input. If the access by the application is not the access through the user input, the electronic device may proceed to step 1470 and deny the access by the application. If the access by the application is the access through the user input the electronic device may proceed to step 1450 and permit the access by the application.

Figure 15:
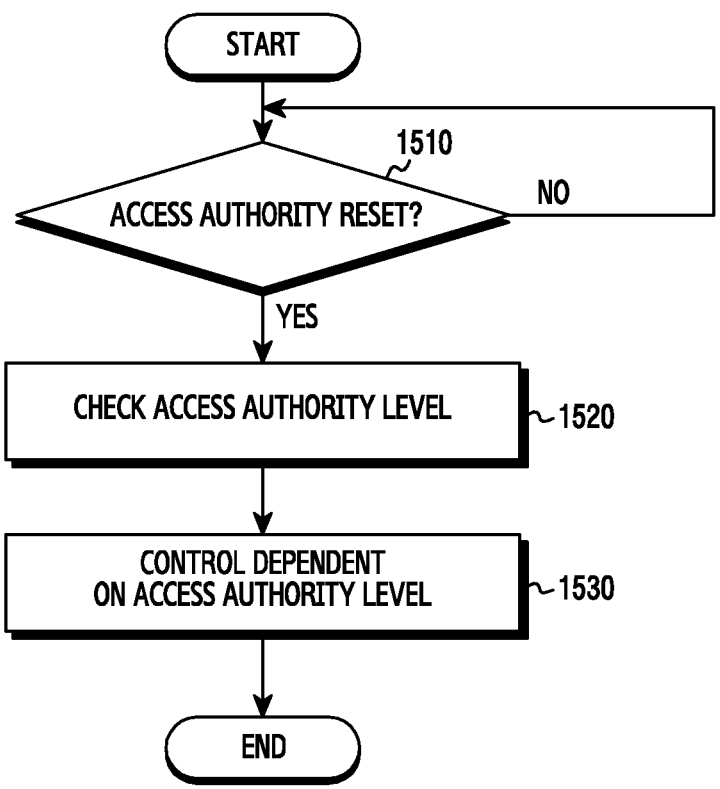
FIG. 15 illustrates a flow of an operation for contents control according to an exemplary embodiment of the present disclosure.

FIG. 15 illustrates a flow of an operation for contents control according to an exemplary embodiment of the present disclosure.

Referring to FIG. 15, in step 1510, an electronic device may determine if an access authority is reset to an application requesting the access authority for access target contents. The access target contents may be designated according to a preset contents list or be directly designated by user's selection. Resetting of the access authority may be performed after the application is installed or in case that the application accesses the designated contents. If the access authority of the application has not been reset, the electronic device may request a user to reset the access authority of the application. Also, the electronic device may check if the request for the access authority of the application is made through a user input. If the request for the access authority of the application is made through the user input, the electronic device may permit the access by the application.

In step 1520, the electronic device may check an access authority level of the application. By checking the access authority level of the application, if the access authority level of the application has not been set, the electronic device may control to request the user to set the access authority level of the application. The access authority level may include "Access permission," "Access block," "Access permission only at user input," etc.

In step 1530, the electronic device performs control dependent on the access authority level of the application. If the access authority level of the application is set as "Access block," the electronic device may block the access by the application. However, although the access authority level of the application is set as "Access block," if the access by the application is an access through a user input, the electronic device may permit the access by the application. Also, if the access authority level of the application is "Access permission," the electronic device may permit the access by the application. If the access by the application is a contents access through a request of another application, the electronic device may check an access authority level of another application. If the access authority level of another application is "Access permission," the electronic device may permit the access by the application. If the access authority level of another application is "Access block," the electronic device may block the access by the application. Although the access authority level of another application is "Access block," if the access of another application is an access through a user input, the electronic device may permit the access by the application.

Figure 16A:
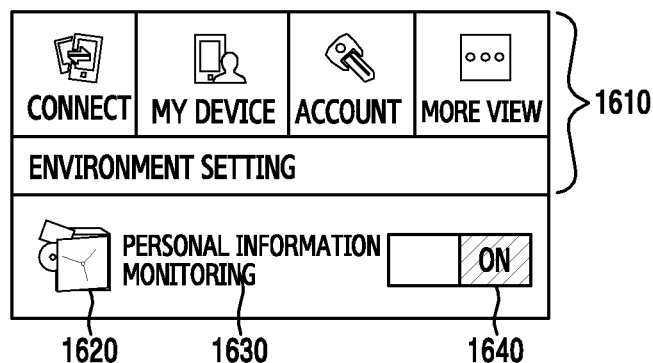
FIG. 16A, FIG. 16B, FIG. 16C illustrate a screen for controlling an electronic device at the time of access of an application to contents according to an exemplary embodiment of the present disclosure.
Figure 16B:
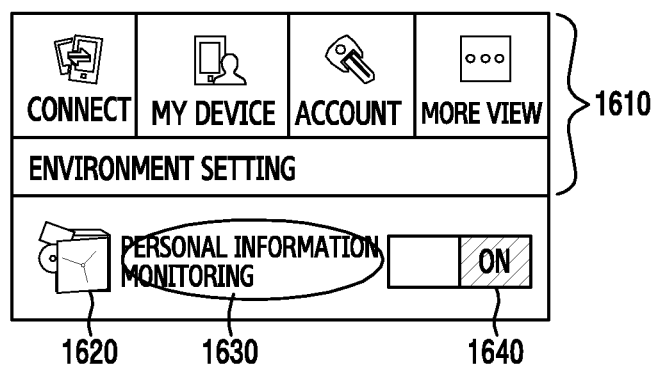
Figure 16C:
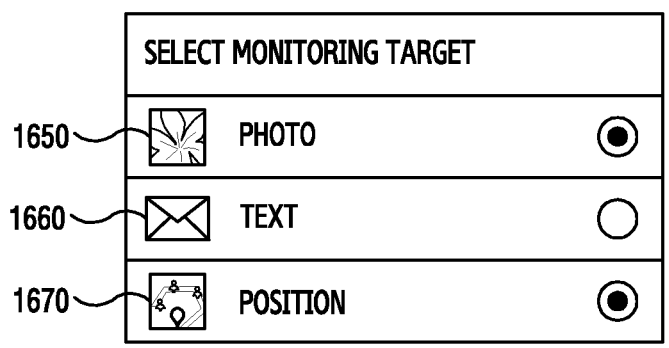

FIG. 16A, FIG. 16B, FIG. 16C illustrate a screen for controlling an electronic device at the time of access by an application to contents according to an exemplary embodiment of the present disclosure.

Referring to FIG. 16A, the electronic device may display a screen for displaying personal information monitoring or non-monitoring. The screen for displaying the personal information monitoring or non-monitoring may include an environment setting part 1610, a personal information monitoring icon 1620, a personal information monitoring display part 1630, and a personal information monitoring activation or non-activation display part 1640. FIG. 16A illustrates one exemplary embodiment of a screen of setting an environment of the electronic device. The electronic device may include options other than options illustrated in FIG. 16A. The personal information monitoring icon 1620 and the personal information monitoring display part 1630 for monitoring personal information may be displayed using other terms or icons.

Referring to FIG. 16B, a user may select an option for personal information monitoring displayed in the electronic device. According to an exemplary embodiment of the present disclosure, in case that the user selects the option for the personal information monitoring, an icon for displaying the activation or non-activation of the selected option for the personal information locking may be changed. In case that the user selects the option for the personal information monitoring, the icon for displaying the activation or non-activation of the selected option may be displayed as "On" or "Off."

Referring to FIG. 16C, according to an exemplary embodiment of the present disclosure, in case that the user selects the option for the personal information monitoring, a screen of FIG. 16C may be displayed. By displaying the screen of FIG. 16C, the electronic device may allow the user to set contents of which personal information will be monitored. FIG. 16C illustrates examples of photo 1650, text 1660, and position 1670 contents, but the contents are displayed for description convenience and contents other than the contents may be displayed.

According to one exemplary embodiment of the present disclosure, if the user presets a monitoring target, the preset monitoring target may be set as a target for personal information monitoring with the screen of FIG. 16C not being displayed. Also, in case that the user selects an option for personal information monitoring according to the setting, all contents may be set as targets for personal information monitoring as well with the screen of FIG. 16C not being displayed.

Figure 17:
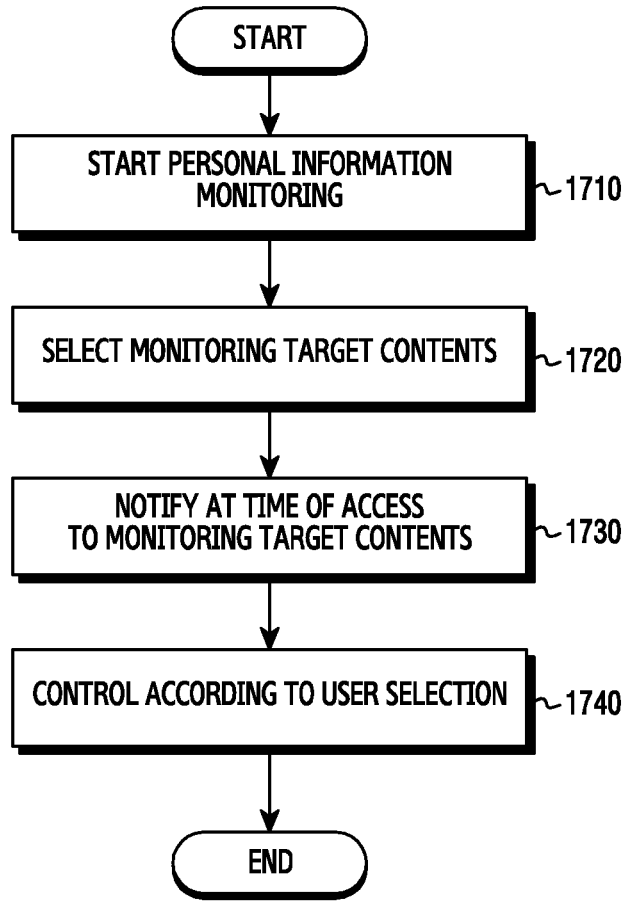
FIG. 17 illustrates a flowchart for controlling an electronic device at the time of access of an application to contents according to an exemplary embodiment of the present disclosure.

FIG. 17 illustrates a flowchart for controlling an electronic device at the time of access by an application to contents according to an exemplary embodiment of the present disclosure.

Referring to FIG. 17, in step 1710, the electronic device may start personal information monitoring. The personal information monitoring may be activated or inactivated by selecting the personal information monitoring icon 1620 or the personal information monitoring display part 1630 illustrated in FIG. 16A, FIG. 16B, FIG. 16C. The personal information monitoring may start as a user activates the personal information monitoring.

In step 1720, the electronic device may set monitoring target contents in accordance with user's selection. By displaying the screen of FIG. 16C, the electronic device may set to allow the user to select the monitoring target contents.

According to one exemplary embodiment of the present disclosure, if the user presets a monitoring target, the preset monitoring target may be set as a target for personal information monitoring with the screen of FIG. 16C not being displayed. Also, in case that the user selects an option for personal information monitoring according to the setting, all contents may be set as targets for personal information monitoring as well with the screen of FIG. 16C not being displayed.

In step 1730, in case that a specific application accesses the monitoring target contents, the electronic device may display a notification of the access to the user. The electronic device may display the screen of FIG. 7B and, in case that a specific application accesses the monitoring target contents, the electronic device may display a screen capable of selecting whether to always permit a notification, whether to only once permit the notification, whether to compulsorily stop the application, or whether to delete the application.

In step 1740, the electronic device may perform control according to user's selection. If the user selects the "Always permission" 762 option of FIG. 7B, the electronic device may always permit the access by the application 710 and no longer notify that the application 710 accesses the contents 720.

If the user selects the "Permission only this time" 764 option, the electronic device may once permit the access by the application 710. In case that the user selects the "Permission only this time" 764 option, the electronic device may again display the access message 760 to the user, when the application 710 accesses the contents 720 later.

If the user selects the "App compulsory termination" 766 option, the electronic device may stop the application 710. Also, if the user selects the "App deletion" 768 option, the electronic device may delete the application 710.

Figure 18:
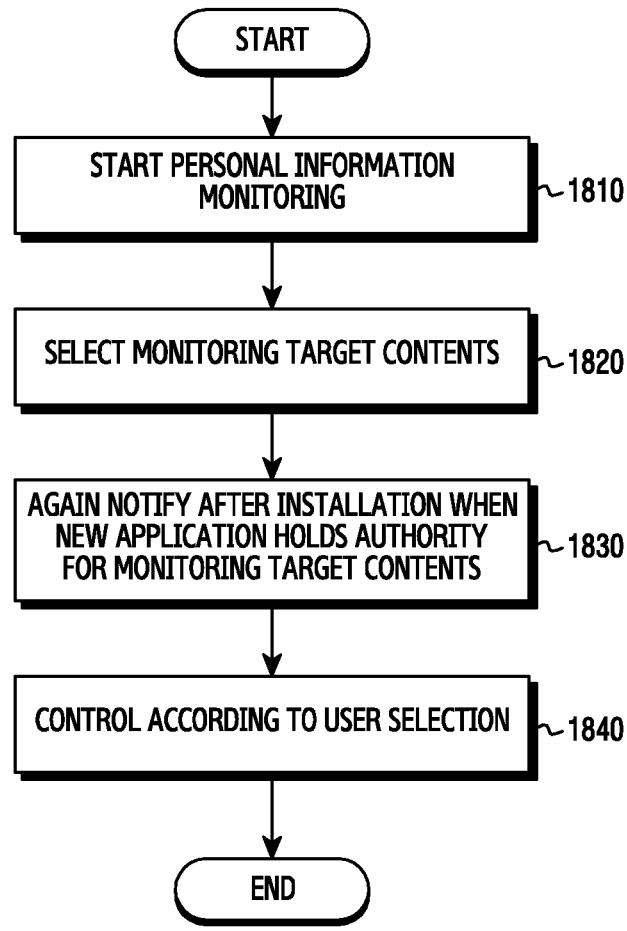
FIG. 18 illustrates a flow of an operation for controlling an electronic device in case that a newly installed application holds an access authority for contents according to an exemplary embodiment of the present disclosure.

FIG. 18 illustrates a flow of an operation for controlling an electronic device in case that a newly installed application holds an access authority for contents according to an exemplary embodiment of the present disclosure.

FIG. 18 illustrates controlling the electronic device in case that a specific application is newly installed and the newly installed application holds an access authority for specific contents.

Referring to FIG. 18, in step 1810, the electronic device may start personal information monitoring. The personal information monitoring may be activated or inactivated by selecting the personal information monitoring icon 1620 or the personal information monitoring display part 1630 illustrated in FIG. 16A, FIG. 16B, FIG. 16C. The personal information monitoring may start as a user activates the personal information monitoring.

In step 1820, the electronic device may set monitoring target contents in accordance with user's selection. By displaying the screen of FIG. 16C, the electronic device may set to allow the user to select the monitoring target contents.

According to one exemplary embodiment of the present disclosure, if the user presets a monitoring target, the preset monitoring target may be set as a target for personal information monitoring with the screen of FIG. 16C not being displayed. Also, in case that the user selects an option for personal information monitoring according to the setting, all contents may be set as targets for personal information monitoring as well with the screen of FIG. 16C not being displayed.

In step 1830, in case that the newly installed application holds the access authority for the monitoring target contents, the electronic device may display a screen for access control to the user. The screen may be the screen of FIG. 7B.

In step 1830, in case that the newly installed application accesses the monitoring target contents, the electronic device may display a notification of the access to the user. The electronic device may display the screen of FIG. 7B and, in case that a specific application accesses the monitoring target contents, the electronic device may display a screen capable of selecting whether to always permit a notification, whether to only once permit the notification, whether to compulsorily stop the application, or whether to delete the application.

In step 1840, the electronic device may perform control according to user's selection. If the user selects the "Always permission" 762 option of FIG. 7B, the electronic device may always permit the access by the application 710 and no longer notify that the application 710 accesses the contents 720.

If the user selects the "Permission only this time" 764 option, the electronic device may once permit the access by the application 710. In case that the user selects the "Permission only this time" 764 option, the electronic device may again display the access message 760 to the user, when the application 710 accesses the contents 720 later.

If the user selects the "App compulsory termination" 766 option, the electronic device may stop the application 710. Also, if the user selects the "App deletion" 768 option, the electronic device may delete the application 710.

Figure 19:
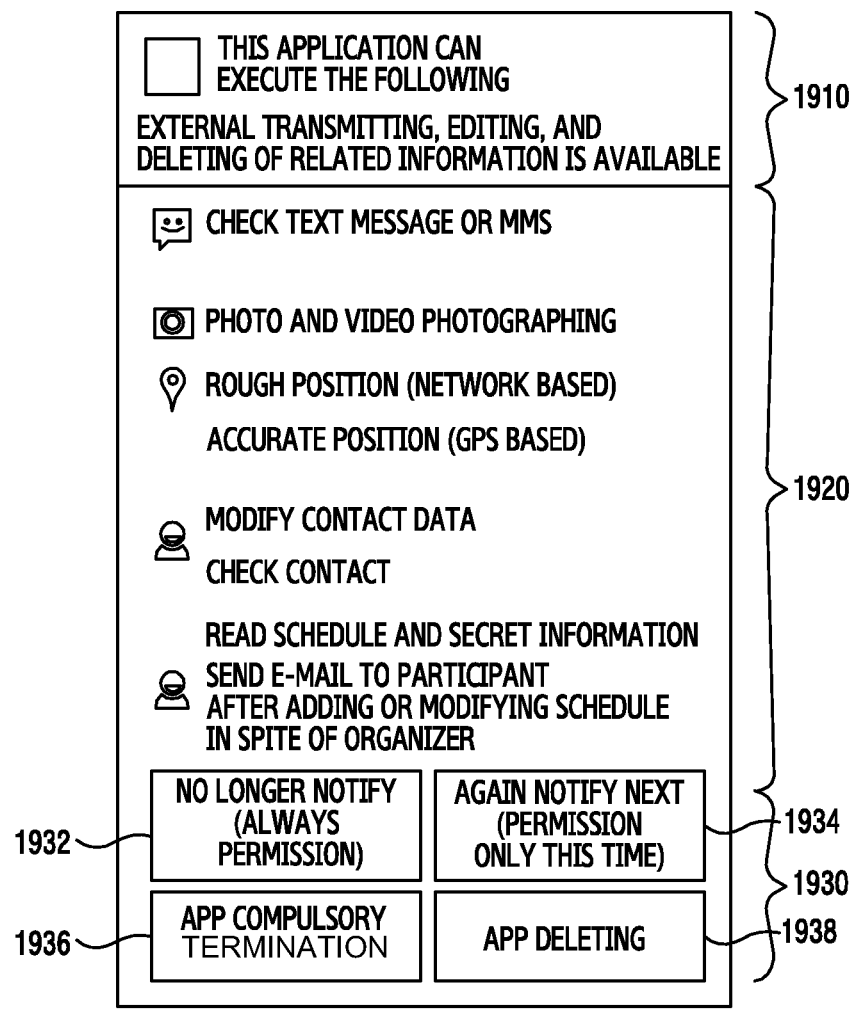
FIG. 19 illustrates a screen for access restriction management in case that a newly installed application holds an access authority for contents according to an exemplary embodiment of the present disclosure.

FIG. 19 illustrates a screen for access restriction management in case that a newly installed application holds an access authority for contents according to an exemplary embodiment of the present disclosure.

Referring to FIG. 19, in case that the newly installed application accesses monitoring target contents, an electronic device may display a screen for controlling the access of the newly installed application to the monitoring target contents. In the screen for controlling the access to the monitoring target contents, a danger warning display part 1910 may display a screen of warning a danger of an expected operation resulting from the execution of the newly installed application.

A display part 1920 for displaying a list of authorities related to a plurality of designated personal contents may display a list of authorities related to the monitoring target contents.

A selection part 1930 for selecting a user selection option may display the selection option to the user such that the user may control the application. In an example of FIG. 19, the electronic device may display to the user an option 1932 for always permitting the access control screen, an option 1934 for only once permitting the access control screen, an option 1936 for compulsorily termination of the application, and an option 1938 for deleting the application.

Figure 20A:
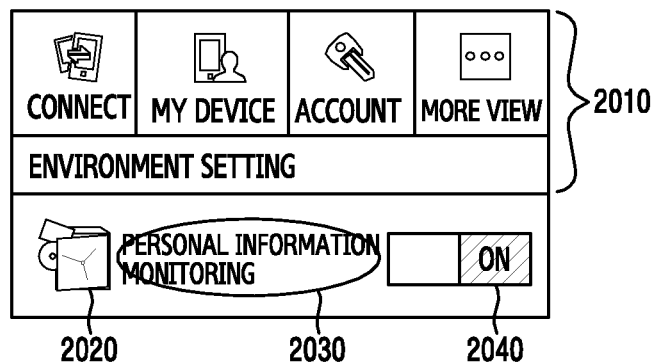
FIG. 20A, FIG. 20B, and FIG. 20C illustrate a display screen for locking application control by contents according to an exemplary embodiment of the present disclosure.
Figure 20B:
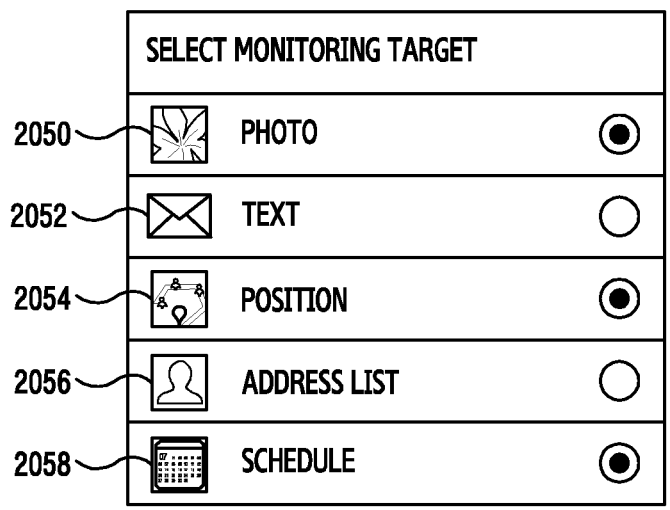
Figure 20C:
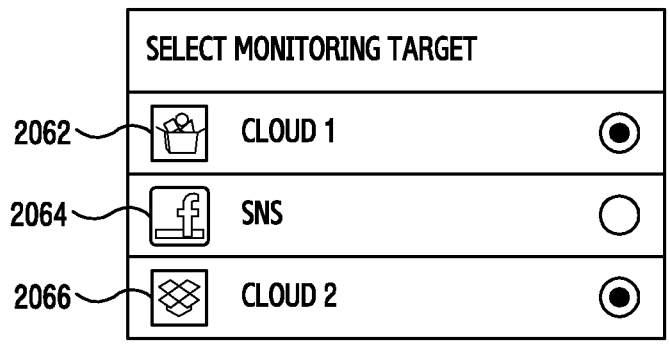

FIG. 20A, FIG. 20B, and FIG. 20C illustrate a display screen for locking application control by contents according to an exemplary embodiment of the present disclosure.

FIG. 20A illustrates an example of a screen for personal information locking. Referring to FIG. 20A, the electronic device may display a screen for displaying personal information locking or non-locking. The screen for displaying the personal information locking or non-locking may include an environment setting part 2010, a personal information locking icon 2020, a personal information locking display part 2030, and a personal information locking activation or non-activation display part 2040. FIG. 20A illustrates one exemplary embodiment of a screen of setting an environment of the electronic device. The electronic device may include options other than options illustrated in FIG. 20A. The option for personal information locking may be displayed using other terms or icons. A user may select an option for personal information locking displayed in the electronic device. According to an exemplary embodiment of the present disclosure, in case that the user selects the option for the personal information locking, an icon for displaying the activation or non-activation of the selected option for the personal information locking may be changed. In case that the user selects the option for the personal information locking, the icon for displaying the activation or non-activation of the selected option may be displayed as "On" or "Off."

FIG. 20B illustrates an example of displaying a list of locking target contents. Referring to FIG. 20B, according to an exemplary embodiment of the present disclosure, in case that the user selects the option for the personal information locking, a screen of FIG. 20B may be displayed. By displaying the screen of FIG. 20B, the electronic device may allow the user to set contents for personal information locking. FIG. 20B illustrates only photo 2050, text 2052, position 2054, address book 2056, and schedule 2058 contents, but these are illustrated for description convenience and contents other than the contents may be displayed.

According to one exemplary embodiment of the present disclosure, if the user presets a locking target, the preset locking target may be set as a target for personal information locking with the screen of FIG. 20B not being displayed. Also, in case that the user selects an option for personal information locking according to the setting, all contents may be set as targets for personal information locking as well with the screen of FIG. 20B not being displayed.

Referring to FIG. 20B, the electronic device may display contents to be set as a locking target. The user may select specific contents among the contents displayed in the electronic device. Also, the user may select specific contents among the contents displayed in the electronic device, and select, as a personal information locking exception application, an application among applications accessing the selected contents.

FIG. 20C illustrates an example of a screen of a case of selecting the specific contents among the contents displayed in the electronic device. Referring to FIG. 20C, in case that the user selects the specific contents among the contents displayed on the screen of FIG. 20B, the electronic device may display applications accessing the selected contents. Accordingly to this, the user may select a specific application among the displayed applications, and set to make the access by the selected application to the specific contents available despite that the specific contents are the locking target. If the user does not set the personal information locking exception application for the specific contents being the locking target, the access of all the applications to the specific contents may be blocked. FIG. 20C illustrates only "Cloud1" 2062, "SNS" 2064, and "Cloud2" 2006 applications, but these are for understanding of the drawings and other applications may be displayed.

Figure 21:
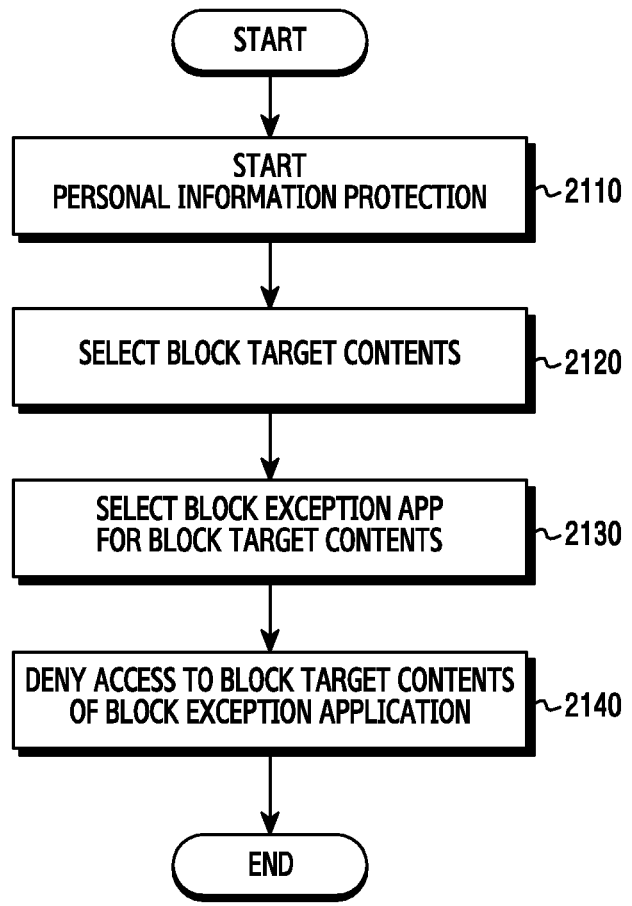
FIG. 21 illustrates a flow of control according to setting of locking target contents according to an exemplary embodiment of the present disclosure.

FIG. 21 illustrates a flow of control according to setting of locking target contents according to an exemplary embodiment of the present disclosure.

In step 2110, an electronic device may start personal information protection. After displaying the screen of FIG. 20A, the electronic device may start the personal information protection, if a user selects a personal information locking option.

In step 2120, the electronic device may set blocking target contents. After displaying the screen of FIG. 20B, the electronic device may control such that the user selects specific contents and sets the selected contents as the blocking target contents.

In step 2130, the electronic device may set a block exception application for the blocking target contents. After displaying the screen of FIG. 20C, the electronic device may control such that the user selects a specific application and sets the selected application as the block exception application.

In step 2140, the electronic device may prohibit the block exception application from accessing the blocking target contents. In step 2130, when applications other than the set application accesses the blocking target contents, the electronic device may prohibit the other applications from accessing to the blocking target contents.

FIG. 22A, FIG. 22B, FIG. 22C, and FIG. 22D illustrate an example of control for access restriction dependent on a contents storage space according to an exemplary embodiment of the present disclosure.

Figure 22:
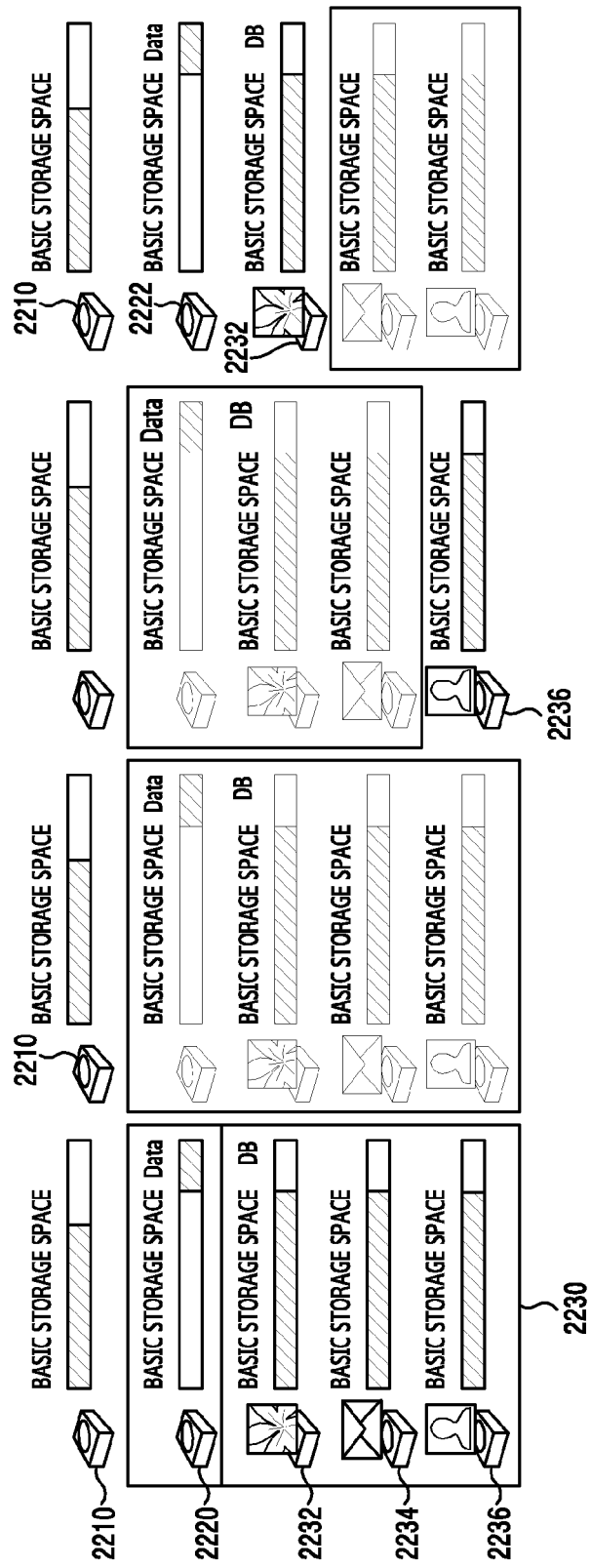
FIG. 22A, FIG. 22B, FIG. 22C, and FIG. 22D illustrate an example of control for access restriction dependent on a contents storage space according to an exemplary embodiment of the present disclosure.

Referring to FIG. 22A, an electronic device may divide a storage space and store contents in the divided storage space. Referring to FIG. 22A, the electronic device may use a basic storage space 2210 and a separate storage space 2220. To perform contents control dependent on a storage space, a user may store contents to be controlled dependent on the storage space, in the separate storage space 2220. Referring to FIG. 22A, the separate storage space 2220 may include a general storage space 2222 and a contents storage space 2230. The contents storage space 2230 may include photo 2232, text 2234, and address book 2236 storage spaces. Only the photo 2232, text 2234, and address book 2236 storage spaces are illustrated for the sake of explanation of the drawings, but storage spaces for contents other than the contents may be included.

Referring to FIG. 22B, if user's using of the electronic device is not sensed, the electronic device may hide the contents stored in the separate storage space 2220 from being displayed. If a specific application requests access to the hidden contents, the electronic device may provide the specific application with information except for information about the hidden contents and control the access by the application to the hidden contents.

Referring to FIG. 22C, if the user's using of the electronic device is not sensed, the electronic device may permit an access by an application having an access authority for storage of contents among the contents stored in the separate storage space 2220. For example, the electronic device may set such that a specific application performs storing of the address book 2236 contents when the user does not use the electronic device in relation with the address book 2236 contents. In this case, even when the user does not use the electronic device in relation with the address book 2236 contents, the electronic device may set to permit the specific application to access the address book 2236 contents and perform the storing of the address book 2236 contents. At this time, the specific application cannot check information about contents other than the address book 2236 contents and can check only information about the address book 2236 contents and therefore, an access of the specific application to the contents other than the address book 2236 contents may be unavailable.

Referring to FIG. 22D, the electronic device may set the storage space such that a specific application may check only information about specific contents even when the user is using the electronic device. For example, the electronic device may set such that the specific application checks information about specific contents in the form of photo 2232 and the general storage space 2222. Accordingly to this, even when the user is using the electronic device, the specific application may access the specific contents in the form of photo 2232 and general storage space 2222 whose information is acquirable. Therefore, the electronic device may access the specific contents in the form of photo 2232 and the general storage space 2222 and perform a function of the specific application.

Figure 23:
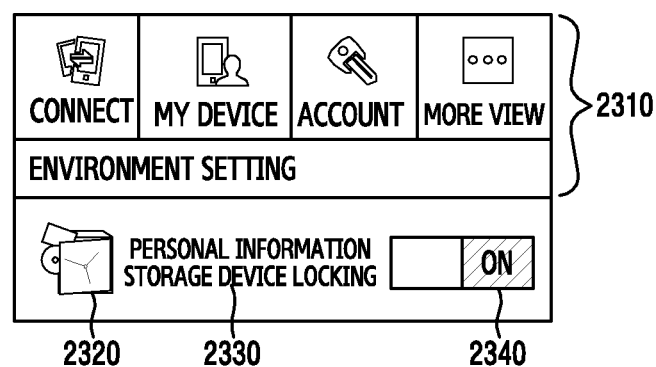
FIG. 23 illustrates a display screen for locking control over a personal information storage device according to an exemplary embodiment of the present disclosure.

FIG. 23 illustrates a display screen for locking control over a personal information storage device according to an exemplary embodiment of the present disclosure.

Referring to FIG. 23, an electronic device may display a screen for displaying the locking or non-locking of a personal information storage device. The screen for displaying the locking or non-locking of the personal information storage device may include an environment setting part 2310, a personal information storage device locking icon 2320, a personal information storage device locking display part 2330, and a personal information storage device locking activation or inactivation display part 2340. The electronic device may include options other than options illustrated in FIG. 23. An option for displaying the locking or non-locking of the personal information storage device may be displayed using other terms or icons. If a user activates the personal information storage device locking option, the electronic device may perform control over a set storage space.

Figure 24:
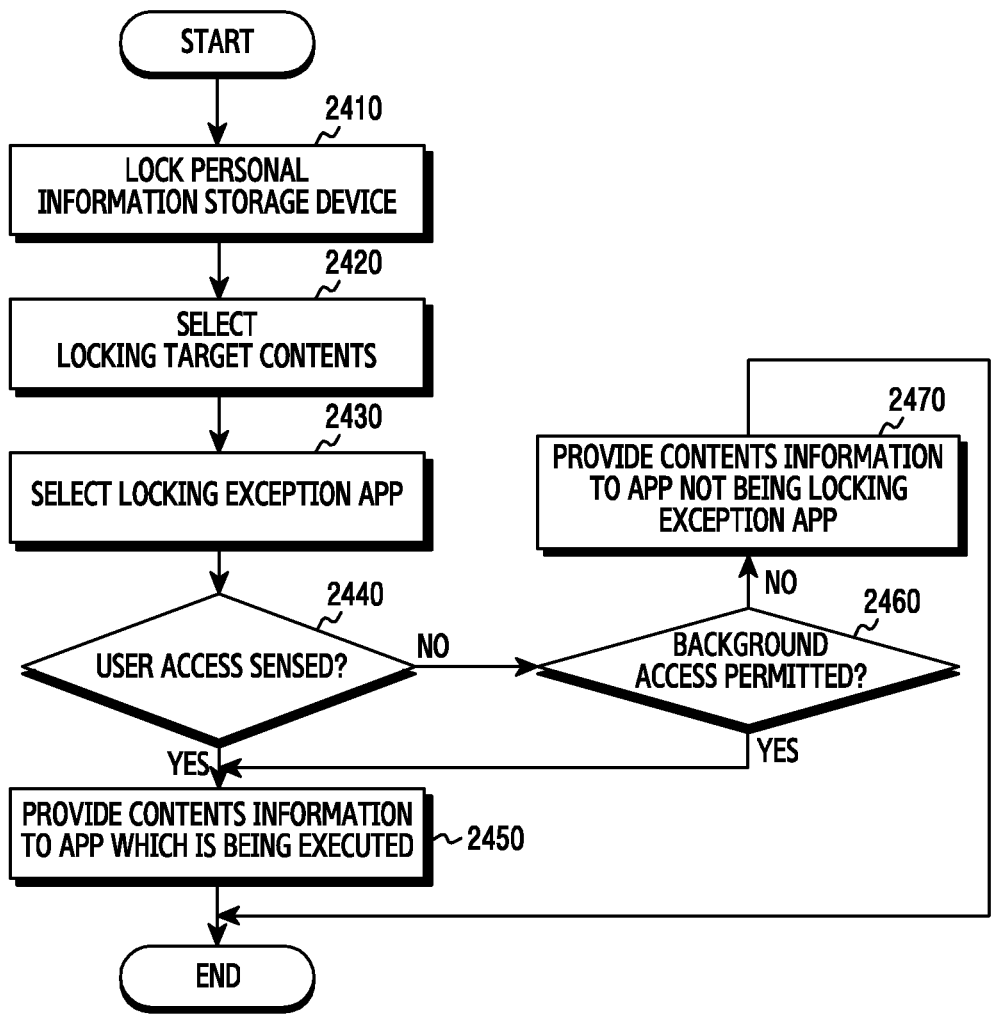
FIG. 24 illustrates a flow of an operation for locking control over a personal information storage device according to an exemplary embodiment of the present disclosure.

FIG. 24 illustrates a flow of an operation for locking control over a personal information storage device according to an exemplary embodiment of the present disclosure.

In step 2410, an electronic device may set locking of a personal information storage device. The electronic device may display the screen of displaying the locking or non-locking of the personal information storage device illustrated in FIG. 23, to a user. Accordingly to this, in case that the user performs an input for activating the personal information storage device locking or non-locking, the electronic device may perform the personal information storage device locking or non-locking.

In step 2420, the electronic device may set locking target contents. The electronic device may display a list of contents to the user, and control to set such that the user sets the locking target contents, or use previously stored locking target contents information to set the locking target contents.

In step 2430, the electronic device may select a locking exception application. The electronic device may set a specific application as the locking exception application such that it can exceptionally permit, although setting the locking target contents in step 2420, an access by the specific application to the locking target contents.

In step 2440, the electronic device may sense a user's access. If the user's access is sensed, the electronic device may proceed to step 2450 and provide a specific application that the user is executing with information about preset specific contents, to make an access by the specific application to the preset specific contents available. Accordingly to this, the specific application may acquire the information about the specific contents and perform an operation using the specific contents.

If the user's access is not sensed, in step 2460, the electronic device may determine if the locking exception application accesses specific contents. If an application accessing the specific contents is the locking exception application in step 2460, the electronic device may proceed to step 2450 and provide the locking exception application with information about the specific contents. Accordingly to this, the specific application may acquire the information about the specific contents and perform an operation using the specific contents.

If an application not being the locking exception application accesses the specific contents in step 2460, the electronic device may proceed to step 2470 and not provide the application not being the locking exception application with the information about the specific contents. Accordingly to this, the application not being the locking exception application may not acquire the information about the specific contents and therefore, the application may not perform the operation using the specific contents.

Figure 25:
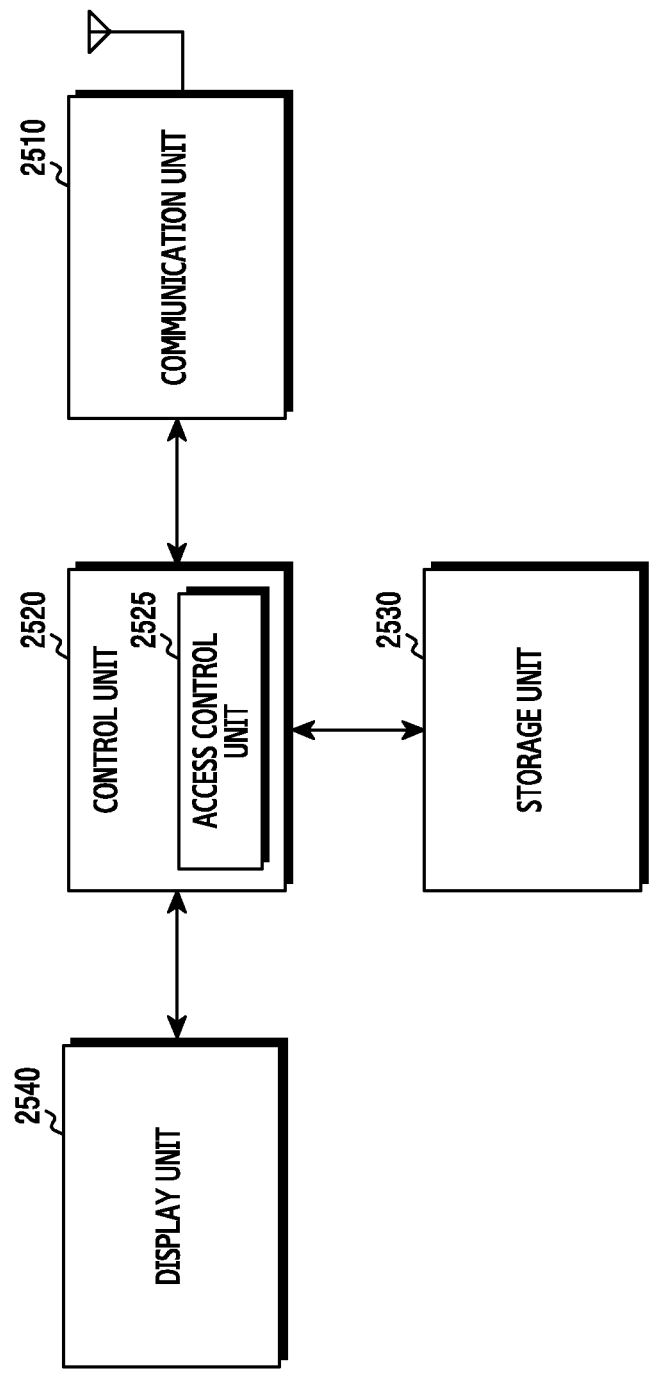
FIG. 25 illustrates a block diagram of a device for contents control according to an exemplary embodiment of the present disclosure.

FIG. 25 illustrates a block diagram of a device for contents control according to an exemplary embodiment of the present disclosure.

Referring to FIG. 25, the device may include a communication unit 2510, a control unit 2520, a storage unit 2530, and a display unit 2540.

The communication unit 2510 may perform a function for transmitting/receiving a signal through a wireless channel, such as signal band conversion, amplification, etc. For example, the communication unit 2510 may include a transmission filter, a reception filter, an amplifier, a mixer, an oscillator, a Digital-to-Analog Converter (DAC), an Analog-to-Digital Converter (ADC), and the like. In FIG. 25, only one antenna is illustrated, but the communication unit 2510 may have a plurality of antennas. The communication unit 2510 may be denoted as a transmission unit, a reception unit, a transmission/reception unit, or a communication unit.

The storage unit 2530 may store data such as a basic program, an application program, setting information, etc. for an operation of the device for contents control. Particularly, the storage unit 2530 may store information related with an access authority for access control. And, the storage unit 2530 may provide stored data through a request of the control unit 2520.

The control unit 2520 may control general operations of a device for managing the electronic device. The control unit 2520 may include an access control unit 2525. The access control unit 2525 may, for example, control the device for contents control to perform the procedures illustrated in FIG. 5, FIG. 6A, FIG. 6B, FIG. 7A, FIG. 7B, FIG. 8, FIG. 9, FIG. 10, FIG. 11, FIG. 12, FIG. 13, FIG. 14, and FIG. 15. In accordance with an exemplary embodiment of the present disclosure, an operation of the control unit 2520 is given as follows.

The control unit 2520 may determine if an access authority of an application requesting the access authority for access target contents is reset. The access target contents may be designated in accordance with a preset contents list or be directly designated by user's selection. Resetting of the access authority of the application may be performed after the application is installed or the application accesses the designated contents. If the access authority of the application has not been reset, the control unit 2520 may request the user to reset the access authority of the application. Also, the control unit 2520 may determine whether an access request of the application is made through a user input. If the access request of the application is made through the user input, the control unit 2520 may permit the access by the application.

The control unit 2520 checks an access authority level of the application. The control unit 2520 may check the access authority level of the application. If the access authority level of the application has not been set, the control unit 2520 may control to request the user to set the access authority level of the application. The access authority level of the application may include "Access permission," "Access block," "Access permission only at user input," etc.

The control unit 2520 may perform control dependent on the access authority level of the application. In case that the access authority level of the application is set as "Access block," the control unit 2520 may block an access by the application, but, although the access authority level of the application is "Access block," if an access by the application is an access through a user input, the control unit 2520 may permit the access by the application. Also, in case that the access authority level of the application is "Access permission," the control unit 2520 may permit the access by the application. If the application accesses contents through a request of another application, the control unit 2520 may check an access authority level of another application. If the access authority level of another application is "Access permission," the control unit 2520 may permit the access by the application. If the access authority level of another application is "Access block," the control unit 2520 may block the access by the application. Although the access authority level of another application is "Access block," if an access of another application is an access through a user input, the control unit 2520 may permit the access by the application.

The display unit 2540 may receive information from the control unit 2520 and display the received information in the electronic device. For example, the display unit 2540 may display an access authority level of an application, resetting of an access authority of the application, and a danger caused by the access authority of the application, etc., on the basis of a result of controlling the access authority for the contents from the control unit 2520.

According to an exemplary embodiment of the present disclosure, there is an effect of protecting user's personal information through controlling an access authority of an application for user contents within an electronic device, and blocking an operation unwanted by a user, thereby being able to decrease the battery consumption of the electronic device. Also, it may prevent an erroneous operation of the application caused by the controlling the access authority of the application for the contents.

Methods according to exemplary embodiments stated in claims and/or specification of the present disclosure may be implemented in a form of hardware, software, or a combination of hardware and software.

If the methods are implemented by the software, a computer-readable storage medium storing one or more programs (i.e., software modules) may be provided. The one or more programs stored in the computer-readable storage medium are configured to be executable by one or more processors within an electronic device. The one or more programs may include instructions for enabling the electronic device to execute the methods according to the exemplary embodiments stated in the claims and/or specification of the present disclosure.

These programs (i.e., software modules or software) may be stored in a Random Access Memory (RAM), a non-volatile memory including a flash memory, a Read Only Memory (ROM), an Electrically Erasable Programmable Read Only Memory (EEPROM), a magnetic disk storage device, a Compact Disc Read Only Memory (CD-ROM), a Digital Versatile Disc (DVD) or an optical storage device of other form, and a magnetic cassette. Or, the programs may be stored in a memory constructed by a combination of some or all of them. Also, each constructed memory may be included in plural as well.

Also, the programs may be stored in an attachable storage device accessible to the electronic device through a communication network such as the Internet, an intranet, a Local Area Network (LAN), a Wireless Local Area Network (WLAN) and a Storage Area Network (SAN), or a communication network constructed by a combination of them. This storage device may access a device performing an exemplary embodiment of the present disclosure through an external port. Also, a separate storage device on the communication network may access the device performing the exemplary embodiment of the present disclosure as well.

In the aforementioned concrete exemplary embodiments of the present disclosure, constituent elements included in the disclosure have been expressed in the singular number or plural number in accordance with the proposed concrete exemplary embodiments. But, the expression of the singular number or plural number is merely selected suitable to a proposed situation for description convenience, and the present disclosure is not limited to singular or plural constituent elements. The constituent element expressed in the plural number may be constructed in the singular number, or the constituent element expressed in the singular number may be constructed in the plural number.

While a concrete exemplary embodiment is described in a detailed description of the present disclosure, it is undoubted that various modifications may be made without departing from the scope of the present disclosure. Therefore, the scope of the present disclosure should not be limited to and defined by the described exemplary embodiments, and should be defined by not only the claims described below but also equivalents to these claims.

What is claimed is:

1. An electronic device comprising:
   a storage;
   a display; and
   a processor coupled to the storage and the display, wherein the processor is configured to:
      set access authorities of a plurality of applications for accessing contents of lists stored in the storage upon installing the plurality of applications;
      detect at least one application of the plurality of applications to access the contents of at least one list;
      change the access authority of the at least one application for accessing the contents of the at least one list; and
      display, on the display, the changed access authority of the at least one application for accessing the contents of the at least one list.

2. The electronic device of claim 1, wherein the processor designates the contents of the at least one list as an access authority management target in accordance with a preset contents list, or designates contents of the at least one list that a user selects as the access authority management target.

3. The electronic device of claim 1, wherein the processor changes the access authority of the at least one application, after the at least one application is installed or upon detecting at least one application attempts to gain access to the contents of the at least one list designated by the processor.

4. The electronic device of claim 1, wherein, before the access authority of the at least one application is changed by the processor, the display displays a message requesting a user to update the access authority of the at least one application.

5. The electronic device of claim 1, wherein, when an access authority level of the at least one application is set as "Block" and the access by the at least one application is an access through a user input, the display displays a message notifying an access restriction to a user.

6. The electronic device of claim 1, wherein the processor determines whether a request of the at least one application is made through a user input.

7. The electronic device of claim 6, wherein, when the request of the at least one application is made through the user input, the processor permits access by the at least one application.

8. The electronic device of claim 5, wherein, when the access authority level of the at least one application to the contents is set as "Block," the processor determines whether the access by the at least one application to the contents is an access through a user input.

9. The electronic device of claim 8, wherein, when the access authority level of the at least one application is set as "Block" and the access by the at least one application is the access through the user input, the processor requests a user to set the access authority of the at least one application.

10. The electronic device of claim 8, wherein, when the access authority level of the at least one application is set as "Block" and the access by the at least one application to the contents is not an access through the user input, the processor denies access by the at least one application.

11. The electronic device of claim 8, wherein, when the access authority level of the at least one application is set as "Access permission" or "Access once permission," the processor permits access by the at least one application.

12. The electronic device of claim 11, wherein, when it is determined that a first application whose access is permitted attempts to gain access to the contents through a request of a second application, the processor checks an access authority of the second application.

13. The electronic device of claim 12, wherein, when an access authority level of the second application is set as "Access permission," the processor permits access of the first application.

14. The electronic device of claim 12, wherein, when an access authority level of the second application is set as "Access block," the processor blocks access of the first application.

15. The electronic device of claim 12, wherein, when an access authority level of the second application is set as "Access block," the processor determines whether the access of the second application is an access through a user input and, when it is determined that the access of the second application is access through the user input, permits access of the first application.

16. The electronic device of claim 1, wherein, when there is a request for access by the at least one application to the contents, the processor controls to display a screen of notifying that the at least one application attempts to gain access to the contents.

17. The electronic device of claim 16, wherein the screen notifying that the at least one application attempts to gain access to the contents comprises at least an option of notifying whenever the at least one application attempts to gain access to the contents, an option of permitting access by the at least one application to the contents, an option of terminating the at least one application, and an option of deleting the at least one application.

18. The electronic device of claim 1, wherein, when the at least one application is first executed after being installed in the electronic device, the processor controls to display a screen notifying the at least one application attempts to gain access to the contents.

19. The electronic device of claim 1, wherein, when the contents are access-prohibited contents, the processor controls to set the access authority of the at least one application as an exception permitted to access the access-prohibited contents.

20. The electronic device of claim 1, wherein the storage comprises a storage region set in the storage depending on a characteristic of the contents to store the contents in the storage region.

21. The electronic device of claim 20, wherein the processor provides the at least one application with information about the storage region that has been set by the processor.

22. The electronic device of claim 20, wherein, when sensing that a user uses the at least one application, the processor provides the at least one application with information about the contents.

23. A method for operating an electronic device, the method comprising:
   setting access authorities of a plurality of applications for accessing contents of lists upon installing the plurality of applications;
   detecting at least one application of the plurality of applications to access the contents of the at least one list;
   changing the access authority of the at least one application for accessing the contents of the at least one list; and
   displaying the changed access authority of the at least one application for accessing the contents of the at least one list.

24. The method of claim 23, wherein setting the access authority for the contents comprises designating the contents as an access authority management target in accordance with a preset contents list, or designating contents that a user selects as the access authority management target.

25. The method of claim 23, wherein changing the access authority for the contents after the at least one application is installed or when the at least one application attempts to gain access to the contents designated.

26. The method of claim 23, further comprising, when the access authority has not been changed, displaying a message requesting a user to change the access authority of the at least one application.

27. The method of claim 23, further comprising, when an access authority level of the at least one application is set as "Block" and the access by the at least one application is an access through a user input, displaying a message notifying an access restriction to a user.

28. The method of claim 27, wherein controlling access by the at least one application in accordance with the access authority that has been changed comprises determining whether a request for access by the at least one application is made through a user input.

29. The method of claim 28, wherein controlling access by the at least one application in accordance with the access authority that has been changed comprises, when the request of the at least one application is made through the user input, permitting access by the at least one application.

30. The method of claim 28, wherein controlling access by the at least one application in accordance with the access authority that has been changed comprises, when the access authority level of the at least one application to the contents is set as "Block," determining whether the access by the at least one application to the contents is an access through a user input.

31. The method of claim 28, wherein controlling access by the at least one application in accordance with the access authority that has been changed comprises, when the access authority level of the at least one application is set as "Block" and the access by the at least one application is access through the user input, requesting a user to set the access authority of the at least one application.

32. The method of claim 30, wherein controlling access by the at least one application in accordance with the access authority that has been changed comprises, when the access authority level of the at least one application is set as "Block" and the access by the at least one application to the contents is not an access through the user input, denying access by the at least one application.

33. The method of claim 32, wherein controlling the access by the at least one application in accordance with the access authority that has been changed, comprises, when the access authority level of the at least one application is set as "Access permission" or "Access once permission," permitting access by the at least one application.

34. The method of claim 33, further comprising, when it is determined that a first application whose access is permitted attempts to gain access to the contents through a request of a second application, checking an access authority of the second application.

35. The method of claim 34, wherein the checking the access authority of the second application comprises, when an access authority level of the second application is set as "Access permission," permitting an access of the first application.

36. The method of claim 34, wherein the checking the access authority of the second application comprises, when an access authority level of the second application is set as "Access block," blocking access of the first application.

37. The method of claim 34, further comprising, when an access authority level of the second application is set as "Access block," determining whether the access of the second application is an access through a user input and, and when it is determined that the access of the second application is access through the user input, permitting access of the first application.

38. The method of claim 23, further comprising, when there is a request for access by the at least one application to the contents, displaying a screen notifying that the at least one application attempts to gain access to the contents.

39. The method of claim 38, wherein the screen notifying that the at least one application attempts to gain access to the contents comprises at least one of an option of notifying whenever the at least one application gains access to the contents, an option of permitting access by the at least one application to the contents, an option of terminating the at least one application, and an option of deleting the at least one application.

40. The method of claim 23, further comprising when the at least one application is executed after being installed in the electronic device, displaying a screen notifying that the at least one application attempts to gain access to the contents.

41. The method of claim 23, further comprising, when the contents are access-prohibited contents, controlling to set the access authority of at least one application as an exception permitted to access the access-prohibited contents.

42. The method of claim 23, wherein the electronic device further comprises storage, the method further comprising the electronic device setting a storage region in the storage depending on a characteristic of the contents and storing the contents in the storage region.

43. The method of claim 42, wherein the electronic device further comprises a processor, the method further comprising providing the at least one application with information about the storage region that has been preset by the processor.

44. The method of claim 42, further comprising, when sensing that a user uses the at least one application, providing the at least one application with information about the contents.

* * * * *